United States Patent [19]

Wu

[11] Patent Number: 5,886,526
[45] Date of Patent: Mar. 23, 1999

[54] APPARATUS AND METHOD FOR DETERMINING PROPERTIES OF ANISOTROPIC EARTH FORMATIONS

[75] Inventor: Peter T. Wu, Sugar Land, Tex.

[73] Assignee: Schlumberger Technology Corporation, Sugar Land, Tex.

[21] Appl. No.: 876,821

[22] Filed: Jun. 16, 1997

Related U.S. Application Data

[60] Provisional application No. 60/020,305, Jun. 19, 1996.

[51] Int. Cl.[6] .............................. G01V 3/08; G01V 3/10
[52] U.S. Cl. ............................................ 324/338; 324/341
[58] Field of Search .................................... 324/338, 333, 324/332, 334, 335, 337, 339, 344, 345, 346, 341; 702/6, 7, 11, 12

[56] References Cited

U.S. PATENT DOCUMENTS

| | | | |
|---|---|---|---|
| 3,305,771 | 2/1967 | Arps | 324/342 |
| 3,551,797 | 12/1970 | Gouilloud et al. | 324/338 |
| 3,849,721 | 11/1974 | Calvert | 324/338 |
| 4,107,597 | 8/1978 | Meador et al. | 324/339 |
| 4,185,238 | 1/1980 | Huchital et al. | 324/338 |
| 4,209,747 | 6/1980 | Huchital | 324/338 |
| 4,278,941 | 7/1981 | Freedman | 324/338 |
| 4,300,098 | 11/1981 | Huchital et al. | 324/338 |
| 4,302,722 | 11/1981 | Gianzero | 324/339 |
| 4,302,723 | 11/1981 | Moran | 324/343 |
| 4,451,789 | 5/1984 | Meador | 324/338 |
| 4,468,623 | 8/1984 | Gianzero et al. | 324/367 |
| 4,511,843 | 4/1985 | Thoraval | 324/338 |
| 4,538,109 | 8/1985 | Clark | 324/338 |
| 4,553,097 | 11/1985 | Clark | 324/338 |
| 4,567,759 | 2/1986 | Ekstrom et al. | 324/355 |
| 4,622,518 | 11/1986 | Cox et al. | 324/341 |
| 4,626,785 | 12/1986 | Hagiwara | 324/339 |
| 4,692,706 | 9/1987 | Mazzagatti et al. | 324/338 |
| 4,730,161 | 3/1988 | Cox et al. | 324/338 |

(List continued on next page.)

OTHER PUBLICATIONS

Anderson, B. and Chew, W.C., "A New High Speed Technique For Calculating Synthetic Induction and DPT Logs," SPWLA 25th Annual Logging Symposium, Paper HH. Jun. 10–13, 1984.

Morse, P. and Feshbach, H., *Methods of Theoretical Physics*, McGraw–Hill, New York, 1953, pp. 896–997.

Kong, Jin Au, *Electormagnetic Wave Theory*, Wiley–Interscience, pp. 120–182. 1986.

(List continued on next page.)

*Primary Examiner*—Jay M. Patidar
*Attorney, Agent, or Firm*—Martin M. Novack; Wayne I. Kanak

[57] ABSTRACT

A method is disclosed for determining the horizontal resistivity, vertical resistivity, and dip of formations surrounding a borehole, comprising the following steps: (a) suspending a logging device in the borehole; (b) transmitting electromagnetic energy from a transmitter location on the logging device, and receiving the transmitted electromagnetic energy at receiver locations on the logging device for a first transmitter-to-receivers spacing associated with the transmitter and receiver locations; (c) determining, from the received electromagnetic energy, measurement characteristics associated with the first transmitter-to-receivers spacing; (d) repeating steps (b) and (c) for a plurality of further transmitter-to-receivers spacings to obtain measurement characteristics for the plurality of further transmitter-to-receivers spacings; (e) generating a model of anisotropic formations that has horizontal resistivity Rh, vertical resistivity Rv, and a Dip angle with respect to a borehole reference; (f) selecting initial model values of Rh, Rv and Dip; (g) computing an error value from the differences, for each of a plurality of the transmitter-to-receivers spacings, between the measurement characteristics and model measurement characteristics obtained from the model using the model values of Rh, Rv, and Dip; (h) modifying the model values of Rh, Rv and Dip; (i) repeating steps (g) and (h) to minimize the error value; and (j) outputting the ultimately modified model values of Rh, Rv, and Dip.

23 Claims, 15 Drawing Sheets

U.S. PATENT DOCUMENTS

| | | | |
|---|---|---|---|
| 4,766,384 | 8/1988 | Kleinberg et al. | 324/339 |
| 4,785,247 | 11/1988 | Meador et al. | 324/338 |
| 4,899,112 | 2/1990 | Clark et al. | 324/338 |
| 4,980,643 | 12/1990 | Gianzero et al. | 324/339 |
| 5,081,419 | 1/1992 | Meador et al. | 324/338 |
| 5,210,495 | 5/1993 | Hapashy et al. | 324/338 |
| 5,278,507 | 1/1994 | Bartel et al. | 324/338 |
| 5,329,448 | 7/1994 | Rosthal | 324/339 |
| 5,345,179 | 9/1994 | Habashy et al. | 324/338 |
| 5,361,239 | 11/1994 | Zoeller | 324/338 |
| 5,389,881 | 2/1995 | Bittar et al. | 324/338 |
| 5,434,507 | 7/1995 | Beren et al. | 324/338 |
| 5,594,343 | 1/1997 | Clark et al. | 324/338 |

OTHER PUBLICATIONS

Clark, B. et al., "A Dual Depth Resistivity Measurement for FEWD", SPWLA 29th Annual Logging Symposium, Paper A. Jun. 5–8, 1988.

Golub and Van Lan, *Matrix Computations*, Johns Hopkins University Press, (1985), pp. 16–20. No month.

Clark, B., "Electromagnetic Propagation Logging While Drilling: Theory and Experiment", SPE Paper 18117 presented at 63rd Annual Technical Conference and Exhibition, Houston, Texas, Oct. 2–5, 1998.

Bonner, S. et al., "New 2–MHZ Multiarray Borehole–Compensated Resistivity Tool Developed for MWD in Slim Holes," SPE Paper 30547, presented at SPE Annual Technical Conference & Exhibition in Dallas, Texas, 22–25 Oct., 1995.

Kunz, K. S. et al., "Some Effects of Formation Anisotropy on Resistivity Measurements in Boreholes", *Geophysics*, vol. 23, No. 4. Feb. 28, 1958.

Moran, J.H. et al. "Effects of Formation Anisotropy on Resistivity Logging Measurements", *Geophysics*, vol. 44, No. 7. Jul. 7, 1979.

Chemali, R. et al., "The Effect of Shale Anisotropy on Focused Resistivity Devices", SPWLA 28th Annual Logging Symposium, Jul. 21, 1987.

Press, W.H. et al.,*Numerical Recipes in C* (Second Edition), Cambridge University Press (1987), pp. 683–688. No month.

Luling, M. et al., "Processing and Modeling 2–MHZ Resistivity Tools in Dipping, Laminated, Anisotropic Formations", Paper QQ, SPWLA 35th Annual Logging Symposium, Jun. 19–22, 1994.

Hagiwara, T., "A New Method to Determine Horizontal–Resistivity in Anisotropic Formations without Prior Knowledge of Relative Dip", Paper Q, SPWLA 37th Annual Logging Symposium, Jun. 16–19, 1996.

Carnahan, B. et al., *Applied Numerical Methods,* John Wiley & Sons (1969), pp. 319–320. No month.

Press, W.H. et al., *Numerical Recipes,* Cambridge University Press (1987), pp. 289–293. No month.

APPARATUS AND METHOD FOR DETERMINING PROPERTIES OF ANISOTROPIC EARTH FORMATIONS

CROSS REFERENCE TO RELATED APPLICATION

The present application claims priority from U.S. Provisional Patent Application No. 60/020,305, filed Jun. 19, 1996, said Provisional Patent Application being incorporated herein by reference.

BACKGROUND OF THE INVENTION

1. Field of the Invention

This invention relates to the field of earth borehole logging and, more particularly, to a method and apparatus for determining properties of anisotropic earth formations. Properties that can be determined using the invention include horizontal conductivity, vertical conductivity, horizontal dielectric constant, vertical dielectric constant, and dip angle.

2. Description of the Related Art

The well logging art has recognized for many years that formations surrounding an earth borehole can be anisotropic with regard to conduction of electrical currents (see e.g. K. S. Kunz et al., "Some Effects Of Formation Anisotropy On Resistivity Measurements In Boreholes", *Geophysics*, Vol. 23, No. 4, 1958). The phenomenon of electrical anisotropy is generally visualized in one of two ways, or a combination thereof, as follows.

In many sedimentary strata, electric current flows more easily in a direction parallel to the bedding planes than transversely to them. A reason for this anisotropy is that a great number of mineral crystals possess a flat or elongated shape (e.g. mica and kaolin). At the time they were laid down, they naturally took an orientation parallel to the plane of sedimentation. The interstices in the formations are, therefore, generally parallel to the bedding plane, and the current is able to travel with facility along these interstices which often contain electrically conductive mineralized water. Such electrical anisotropy, sometimes called microscopic anisotropy, is observed mostly in shales.

If a cylindrical sample is cut from a formation, parallel to the bedding planes, the resistivity of this sample measured with a current flowing along its axis is called the longitudinal (or horizontal) resistivity $R_h$. The inverse of $R_h$ is the horizontal conductivity, $\sigma_h$. If a similar cylinder is cut perpendicular to the bedding planes, the resistivity measured with a current flowing along its axis is called the transversal (or vertical) resistivity $R_v$. The inverse of $R_v$ is the vertical conductivity, $\sigma_v$. The anisotropy coefficient $\lambda$, by definition, is equal to $\sqrt{R_v/R_h}$ (or $\sqrt{\sigma_h/\sigma_v}$). Laboratory measurements have shown that $\lambda$ may range from 1 to about 2.5 in different shales.

Furthermore, the formations are often made up of a series of relatively thin beds having different lithologic characteristics and, therefore, different resistivities (as, for example, sequences of thin shales and hard streaks). In well logging systems the distances between the electrodes or antennas are great enough that the volume involved in a measurement may include several such thin beds. Since, in this situation, the current flows more easily along the more conductive streaks than transversely to the series of beds, there is effective anisotropy. The effects on resistivity measurements of this "macroscopic" anisotropy are cumulative with the effects of the anisotropy due to the above-described microscopic structure of the sediments. Reference can also be made to J. H. Moran et al., "Effects Of Formation Anisotropy On Resistivity Logging Measurements", *Geophysics*, Vol. 44, No. 7, 1979, and to R. Chemali et al., "The Effect Of Shale Anisotropy On Focused Resistivity Devices", SPWLA Twenty-Eighth Annual Logging Symposium, 1987.

The determination of $R_v$ as well as $R_h$ can be useful in various situations. For example, consider the case where the formation consists substantially of two types of material with resistivities $R_1$ and $R_2$ with respective volume fractions $\alpha$ and $1-\alpha$. The effective horizontal and vertical resistivities $R_h$ and $R_v$ are given by $$R_h = \frac{R_1 R_2}{(\alpha R_2) + ((1-\alpha)R_1)} \tag{1}$$

$$R_v = (\alpha R_1) + ((1-\alpha)R_2) \tag{2}$$

If $\alpha$ is known, such as in a shale sequence where a gamma ray measurement or a spontaneous potential measurement has been used to provide the shale fraction, $R_1$ and $R_2$ can be determined from (1) and (2) if $R_h$ and $R_v$ are known.

In situations where the borehole intersects the formations substantially perpendicular to the bedding planes, conventional induction and propagation well logging tools are sensitive almost exclusively to the horizontal components of the formation resistivity. When the borehole intersects the bedding planes at an angle, the tool readings contain an influence from the vertical resistivity as well as the horizontal. This is particularly true when the angle between borehole and the normal to the bedding planes becomes large, such as in directional or horizontal drilling where angles near 90° are commonly encountered. In these cases, the influence of vertical resistivity can cause discrepancies between measurements in these wells and measurements taken of the same formation in nearby vertical wells, thereby preventing useful comparison of these measurements. In addition, since reservoir evaluation is typically based upon data from vertical wells, use of data from wells drilled at high angles may produce erroneous estimates of formation producibility if proper account is not taken of the anisotropy effect.

A number of techniques have been proposed for measuring formation anisotropy and/or vertical conductivity, such as by providing transmitter and/or receiver coils that are perpendicular to the borehole axis in addition to coils having conventional orientations. Reference can be made, for example, to U.S. Pat. Nos. 4,302,722, 4,302,723, and 4,980,643.

Equipment and techniques that determine horizontal and vertical conductivity (or anisotropy) by employing special equipment dedicated specifically to such purpose result in increased equipment cost and increased logging time and/or cost. U.S. Pat. No. 5,329,448 discloses a technique for determining horizontal and vertical conductivity (or anisotropy determinable therefrom) using measurements that are often available from conventional types of equipment utilized for logging earth boreholes during drilling or by wireline. In the '448 Patent, first and second formation conductivity values are derived from measurements taken in a borehole. The derived first and second formation conductivity values are obtained from measurements which are affected differently by the vertical and horizontal conductivities of the formations. These may be, for example, conductivities respectively obtained from phase and attenuation measurements from a receiver pair of a propagation logging device such as that disclosed in U.S. Pat. No. 4,899,112, or conductivities respectively obtained from the resistive and reactive components of an induction logging apparatus. Horizontal and vertical conductivity model values are selected, and error values are computed from the differences between: (i) first and second composite conductivity values computed as a function of the horizontal and vertical conductivity model values, and (ii) the first and second derived formation conductivity values. In iterative fashion, the model values are modified in a manner that tends to reduce the error values. The '448 Patent continues the process until a predetermined criterion of the error is met, whereupon the modified horizontal and vertical conductivity model values can be read out as the determined values.

It is among the objects of the present invention to provide a method and apparatus for determining properties of anisotropic earth formations that improves on prior techniques for determination of horizontal and vertical conductivity and is also capable of providing dip angle and anisotropic dielectric constant characteristics.

SUMMARY OF THE INVENTION

In an embodiment of the invention, the dip angle, as well as the horizontal and vertical resistivities, can be determined, and it is not necessary to have a priori knowledge of the dip angle in order to determine horizontal resistivity and vertical resistivity. In the present application, unless otherwise specified, any references to determination or use of resistivity are intended to generically mean conductivity as well, and vice versa. These quantities are reciprocals, and mention of one or the other herein is for convenience of description, and not intended in a limiting sense.

In accordance with an embodiment of the invention there is disclosed a method for determining the horizontal resistivity, vertical resistivity, and dip of formations surrounding a borehole, comprising the following steps: (a) suspending a logging device in the borehole; (b) transmitting electromagnetic energy from a transmitter location on the logging device, and receiving the transmitted electromagnetic energy at receiver locations on the logging device for a first transmitter-to-receivers spacing associated with the transmitter and receiver locations; (c) determining, from the received electromagnetic energy, measurement characteristics associated with the first transmitter-to-receivers spacing; (d) repeating steps (b) and (c) for a plurality of further transmitter-to-receivers spacings to obtain measurement characteristics for said plurality of further transmitter-to-receivers spacings; (e) generating a model of anisotropic formations that has horizontal resistivity Rh, vertical resistivity Rv, and a Dip angle with respect to a borehole reference; (f) selecting initial model values of Rh, Rv and Dip; (g) computing an error value from the differences, for each of a plurality of said transmitter-to-receivers spacings, between said measurement characteristics and model measurement characteristics obtained from the model using the model values of Rh, Rv, and Dip; (h) modifying the model values of Rh, Rv and Dip; (i) repeating steps (g) and (h) to minimize the error value; and (j) outputting the ultimately modified model values of Rh, Rv, and Dip.

In a disclosed embodiment, the step of selecting initial model values of Rh, Rv, and Dip comprises: producing discretized model values of Rh, Rv and Dip; comparing the measurement characteristics with model measurement characteristics obtained using a multiplicity of combinations of discretized model values; and selecting, as the initial model values, discretized model values based on the comparisons of the comparing step. This search for the initial model values is global in nature and is used to provide candidate model values that are close enough to the correct final solution so that the next more refined process of inversion is likely to converge to the correct final solution rather than to another solution made possible by the complex (and not always orderly) nature of the relationships between the measured resistivities at various spacings and the anisotropic formation dip angle.

Further features and advantages of the invention will become more readily apparent from the following detailed description when taken in conjunction with the accompanying drawings.

DESCRIPTION OF THE PREFERRED EMBODIMENTS

Figure 1:
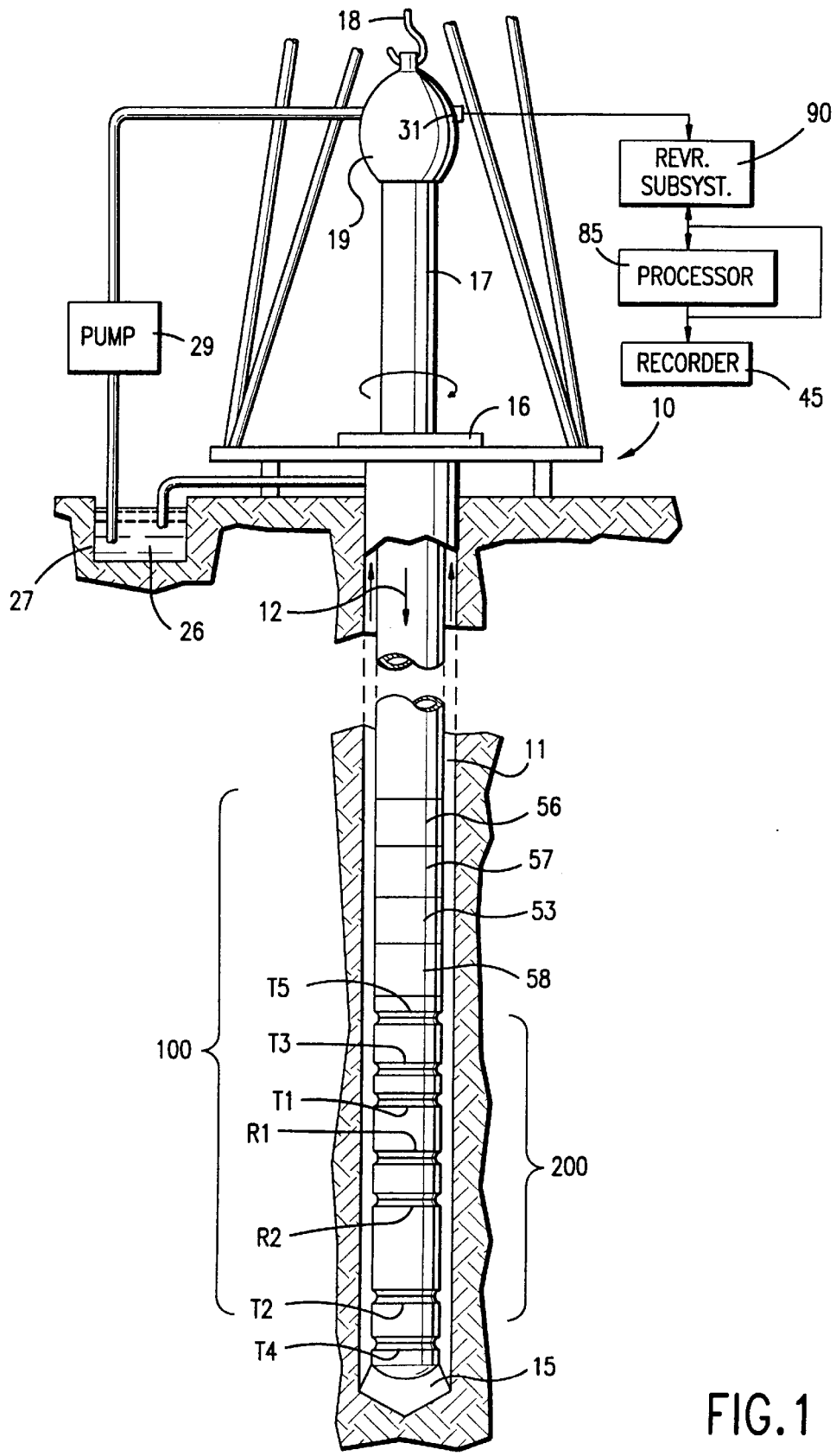
FIG. 1 is a diagram, partially in block form, of a system in which an embodiment of the invention can be employed, and which can be used to practice an embodiment of the method of the invention.

Referring to FIG. 1, there is illustrated an embodiment of the invention in the form of a logging-while-drilling apparatus and method. A platform and derrick 10 are positioned over a borehole 11 that is formed in the earth by rotary drilling. A drill string 12 is suspended within the borehole 11 and includes a drill bit 15 at its lower end. The drill string 12, and the drill bit 15 attached thereto, is rotated by a rotating table 16 (energized by means not shown) which engages a kelly 17 at the upper end of the drill string 12. The drill string 12 is suspended from a hook 18 attached to a traveling block (not shown). The kelly 17 is connected to the hook 18 through a rotary swivel 19 which permits rotation of the drill string 12 relative to the hook 18. Drilling fluid or mud 26 is contained in a pit 27 in the earth. A pump 29 pumps the drilling fluid 26 into the drill string 12 via a port in the swivel 19 to flow downward through the center of drill string 12. The drilling fluid 26 exits the drill string 12 via ports in the drill bit 15 and then circulates upward in the region between the outside of the drill string 12 and the periphery of the borehole 11. As is well known, the drilling fluid 26 thereby carries formation cuttings to the surface of the earth, and the drilling fluid 26 is returned to the pit 27 for recirculation. The small arrows in FIG. 1 illustrate the typical direction of flow of the drilling fluid 26.

Mounted within the drill string 12, preferably near the drill bit 15, is a downhole sensing, processing, storing and transmitting subsystem 100. Subsystem 100 includes a measuring apparatus 200 of the general type disclosed in U.S. Pat. No. 5,594,343 which, in the present embodiment, includes five transmitting antennas T1, T2, T3, T4 and T5 and receiving antennas R1 and R2, and operates in the manner to be described below. The antennas can be of the type described in U.S. Pat. No. 4,899,112; that is, coils wound on mounting material around a special section of metal drill collar which comprises part of the subsystem 100. A communications transmitting portion of the downhole subsystem 100 includes an acoustic transmitter 56, which generates an acoustic signal in the drilling fluid 26 that is representative of the measured downhole conditions. One suitable type of acoustic transmitter, which is known in the art, employs a device known as a "mud siren" which includes a slotted stator and a slotted rotor that rotates and repeatedly interrupts the flow of drilling fluid to establish a desired acoustic wave signal in the drilling fluid. The generated acoustic mud wave travels upward in the drilling fluid through the center of the drill string at the speed of sound in the drilling fluid. The acoustic wave is received at the surface of the earth by transducers represented by reference numeral 31. The transducers, which are, for example, piezoelectric transducers, convert the received acoustic signals to electronic signals. The output of the transducers 31 is coupled to the uphole receiver subsystem 90 which is operative to demodulate the transmitted signals, which are then coupled to processor 85 and recorder 45.

Transmitter 56 is controlled by transmitter control and driving electronics 57 which includes analog-to-digital (A/D) circuitry that converts the signals representative of downhole conditions into digital form. The control and driving electronics 57 may also include a suitable modulator, such as a phase shift keying (PSK) modulator, which conventionally produces driving signals for application to the transmitter 56. These driving signals can be used to apply appropriate modulation to the mud siren of transmitter 56. It will be understood that alternative techniques can be employed for communicating logging information to the surface of the earth.

The downhole subsystem 100 further includes acquisition and processor electronics 58. These electronics include a microprocessor (with associated memory, clock circuitry, and interface circuitry), and processing circuitry. The acquisition and processor electronics 58 are coupled to the measuring apparatus 200 and obtain measurement information therefrom. The acquisition and processor electronics 58 is capable of storing data from the measuring apparatus 200, processing the data and storing the results, and coupling any desired portion of the information it contains to the transmitter control and driving electronics 57 for transmission to the surface by transmitter 56. A battery 53 may provide downhole power. As known in the art, a downhole generator (not shown) such as a so-called "mud turbine" powered by the drilling fluid, can also be utilized to provide power during drilling. If desired, the drilling equipment can optionally be a directional drilling system (not shown) which has, for example, a bottom hole assembly that includes a stabilizer, an offset (or "bent") sub, a mud motor that is driven by the flowing mud, and a near-bit stabilizer. The bent sub typically has an offset or bend angle of ½ to 2 degrees. As is known in the art, when the bit is driven by the mud motor only (with the drill string stationary), the bit will deviate in a direction determined by the tool face direction in which the drill string and bent sub are oriented (so-called "sliding mode"). When it is desired to drill substantially straight, the drill string and the mud motor are both rotated at appropriate rates (so-called "rotating mode"). In this manner, directional drilling can be implemented with reasonable accuracy and without unduly frequent tripping of the drill string.

Figure 2:
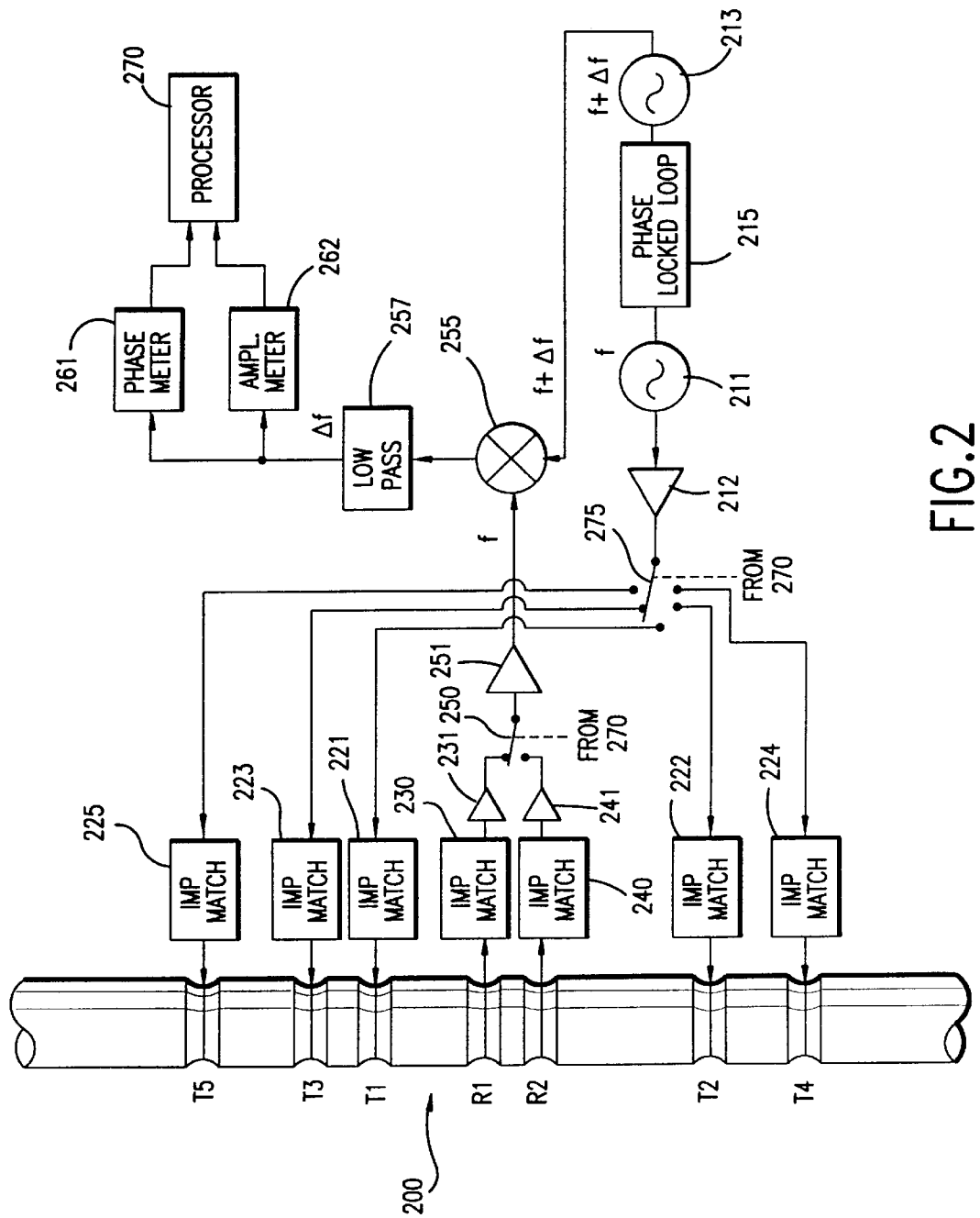
FIG. 2 is a diagram, partially in block form, of electronics in the measuring apparatus and the acquisition and processor electronics of the FIG. 1 embodiment.

FIG. 2 is a block diagram of electronics in the measuring apparatus 200 and the acquisition and processor electronics 58. An oscillator 211 produces an electrical signal of frequency f (e.g. at 2 MHZ), which is amplified by amplifier 212 and applied, via electronically controlled switch 275, to one of the transmitting antennas T1, T2, T3, T4 or T5 through respective impedance matching circuits 221, 222, 223, 224, and 225. The switch 275, under control of the processor 270, selects the transmitter T1, T2, T3, T4 or T5 that is to be energized. The signal from receiver R1 is coupled, via impedance matching circuit 230 and preamplifier 231, to one input of an electronically controlled switch 250. Similarly, the signal from receiver R2 is coupled via impedance matching circuit 240 and preamplifier 241 to the other input of the switch 250. The switch 250, under control of processor 270, selects the (R1) or (R2) receiver output. The selected signal is amplified by amplifier 251 and subsequently translated to a lower frequency $\Delta f$ using a known heterodyne technique. A local oscillator 213 is in a phase locked loop (represented at 215) with the master oscillator 211. The local oscillator 213 has a frequency $f + \Delta f$, where $\Delta f$ is typically a few kilohertz or less. A signal from the local oscillator 213 is mixed with the received signal by a mixer 255, and the mixer output is passed through a low pass filter 257 which blocks signals at f and $f + \Delta f$ and passes the signal at $\Delta f$. The signal at frequency $\Delta f$ contains the phase and amplitude information of the original signal at frequency f. The recognized advantage of this frequency translation is that it is easier to measure the phase and amplitude at kilohertz or lower frequencies than at megahertz frequencies. The signal at frequency $\Delta f$ is measured with a phase meter 261 and with an amplitude meter 262, and the results are input to the processor 270. The phase meter 261 may utilize a reference signal from the phase locked loop 215. The phase and amplitude meters may also include sample-and-hold circuits, to implement comparison of the signal from the respective receivers. Also, the processor 270 can compute the relative phase and amplitude (as well as phase average, as will be described) from the measurements it receives. Reference can be made to U.S. Pat. Nos. 4,185, 238, 4,899,112, and 5,594,343.

As noted above, the processor 270 has associated memory, clocking, and interface circuitry (not shown), as is conventional. The processor 270 can implement storage of the measurements of phase and amplitude, processing of these measurements, storage of the results of the processing, and/or coupling of the measurements and/or processing results to the transmitter control and driving electronics 57 for transmission to the earth's surface. As is known in the art, a downhole clock can be utilized to keep track of time, which can subsequently be correlated with depth level by virtue of keeping a record of the drill string progress. (In general, depth level means longitudinal depth in the borehole.) The clock, which can typically be part of the system in conjunction with the processor 270, can be synchronized with the system before a trip downhole. Also, if desired, communication with the downhole subsystem, using mud pulse technology or other suitable communication means, can be utilized to convey timing synchronization and/or depth level information, as well as to communicate data in general. It will be understood that the invention can be utilized in conjunction with any suitable technique for keeping track of depth level.

Figure 3:
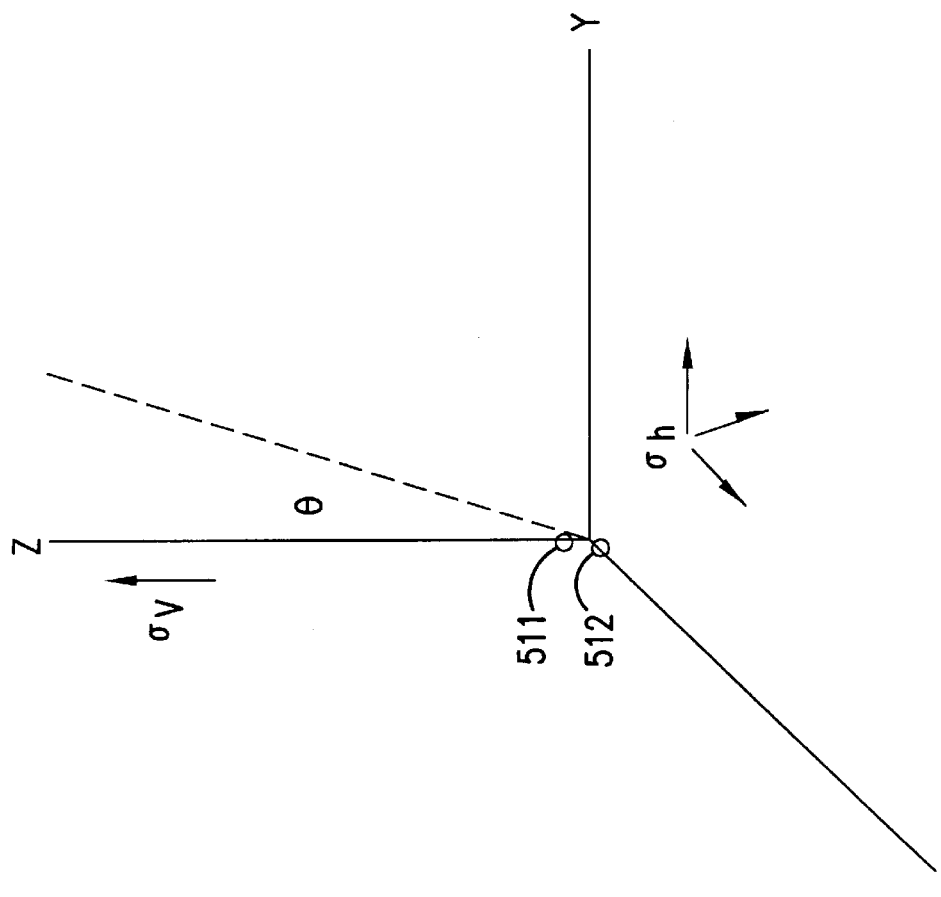
FIG. 3 is a diagram illustrating a transverse isotropic model with a dip angle.

Consider the model space in the diagram of FIG. 3 in which the z direction is considered vertical and the x-y plane considered horizontal. Initially, assume that bedding planes are perpendicular to the z direction and let $\sigma_v$ and $\sigma_h$ be the conductivities in the vertical (z) direction and the horizontal direction (x-y plane), respectively. This is a so-called "transverse isotropic" (TI) model. As described in Moran et al., "Effects Of Formation Anisotropy On Resistivity Logging Measurements", *Geophysics*, Vol. 44, No. 7, 1979, and summarized in the above-referenced U.S. Pat. No. 5,329,448, the logging device coil fields can be considered as the superposition of magnetic dipoles 511 and 512 (FIG. 3) having respective magnetic moments. The magnetic dipole 511 is oriented in the vertical direction and the magnetic dipole 512 is oriented in a direction in the horizontal plane (arbitrarily, the x direction, in this case). The following notation is introduced.

$$\lambda = \sqrt{\sigma_h/\sigma_v} \quad (3)$$

$$k_h = \sqrt{i\omega\mu\sigma_h}$$

$$k_v = \sqrt{i\omega\mu\sigma_v}$$

$$r = \sqrt{x^2 + y^2 + z^2}$$

$$s = \sqrt{x^2 + y^2 + \lambda^2 z^2}$$

$$\rho = \sqrt{x^2 + y^2}$$

Then the Hertz vector and scalar potential for a magnetic dipole located at x=y=z=0 and oriented in the x direction is given by:

$$\pi_x = \frac{M_x}{4\pi\lambda} \frac{e^{ik_v s}}{s} \quad (4)$$

$$\pi_y = 0$$

$$\pi_z = \frac{M_x}{4\pi} \frac{x}{\rho^2} \left( \lambda z \frac{e^{ik_v s}}{s} - z \frac{e^{ik_h r}}{r} \right)$$

$$\Phi = \frac{M_x}{4\pi} \frac{ik_h x}{\rho^2} \left[ e^{ik_v s} - e^{ik_h r} + \frac{\rho^2}{r^2} \left( 1 - \frac{1}{ik_h r} \right) e^{ik_h r} \right]$$

For a similar dipole oriented in the z direction:

$$\pi_x = 0 \quad (5)$$

$$\pi_y = 0$$

$$\pi_z = \frac{M_z}{4\pi} \frac{e^{ik_h r}}{r}$$

$$\Phi = \frac{M_z}{4\pi} \frac{ik_h z}{r^2} \left( 1 - \frac{1}{ik_h r} \right) e^{ik_h r}$$

The electric and magnetic fields are given by:

$$\sigma \vec{E} = i\omega\mu_0 \sigma_h \vec{\nabla} \times \vec{\Pi} \quad (6)$$

$$\vec{H} = i\omega\mu_0 \sigma_h \vec{\Pi} + \vec{\nabla}\Phi \quad (7)$$

From these expressions for the electric and magnetic fields, the voltages at the receivers can be derived as being equal to $i\omega^2 \Pi r_R^2 R \vec{H} \cdot \vec{n}$ where $\vec{n}$ is the direction along the axis of the tool, $r_R$ is the radius of the receiver coil, and R is the number of turns on the receiver. For an induction or a propagation logging tool $M = \Pi R_T^2 TI$ where $R_T$ is the radius of the transmitter coil, T is the number of turns on the transmitter coil, and I is the current.

From equations (6) and (7) one can write the magnetic field at the receiver coil for a transmitter at the origin and the tool tilted at an angle $\theta$ from z in the x-z plane. For simplicity, it can be assumed that the tool remains in the x-z plane. Then the components of the dipole moment of the transmitter are given by:

$$M_x = M \sin \theta \quad (8)$$

$$M_z = M \cos \theta \quad (9)$$

Define $H_{i,j}$ as the magnetic field in the i direction due to the component of the source in the j direction. This gives:

$$H_{x,x} = \frac{M_x}{4\pi} \left( \frac{e^{ik_h r}}{r^3} \left[ \frac{3x^2}{r^2} - 1 + k_h^2 z^2 + \frac{ik_h r^3}{x^2} + ik_h r - \frac{3ik_h^3 x^2}{r} \right] - e^{ik_v s} \left[ \frac{ik_h}{x^2} \right] \right) \quad (10)$$

$$H_{x,z} = \frac{M_z}{4\pi} \frac{e^{ik_h r}}{r^3} \left[ \frac{3xz}{r^2} - k_h^2 xz - \frac{3ik_h xz}{r} \right] \quad (11)$$

$$H_{z,x} = \frac{M_x}{4\pi} \frac{e^{ik_h r}}{r^3} \left[ \frac{3xz}{r^2} - k_h^2 xz - \frac{3k_h i xz}{r} \right] \quad (12)$$

$$H_{z,z} = \frac{M_z}{4\pi} \frac{e^{ik_h r}}{r^3} \left[ \frac{3z^2}{r^2} - 1 + k_h^2 x^2 - \frac{3ik_h z^2}{r} + ik_h r \right] \quad (13)$$

Since the transmitter and receiver are aligned in the same direction, the voltage in the receiver coil is given by:

$$V = (i\omega^2 \Pi r_R^2 R)(\cos \theta (H_{z,x} + H_{z,z}) + \sin \theta (H_{x,z} + H_{x,x})) \quad (14)$$

Once the voltage at each of the receiver coils due to each of the transmitter coils is determined, the total measurement can be determined by adding the voltages in the case of an induction tool, or by taking the complex ratio of the voltages in the case of a propagation tool. For example, for the propagation logging device of FIGS. 1 and 2, for each transmitter position, the absolute value of the voltage at each receiver can be obtained as the square root of the sum of squares of the real and imaginary parts of the complex voltage (equation (14)), and the ratio of the absolute values provides the attenuation, from which the attenuation-determined resistivity Rad is obtained. The phase for each receiver is obtained from the arc tangent of the ratio of the imaginary and real parts of the complex voltage. The phase shift is the difference in phase at the two receivers and the phase average is the average of the phases at the two receivers. The phase-shift-determined resistivity Rps and the phase-average-determined resistivity Rpa are respectively determined from the phase shift and the phase average.

Figure 4A:
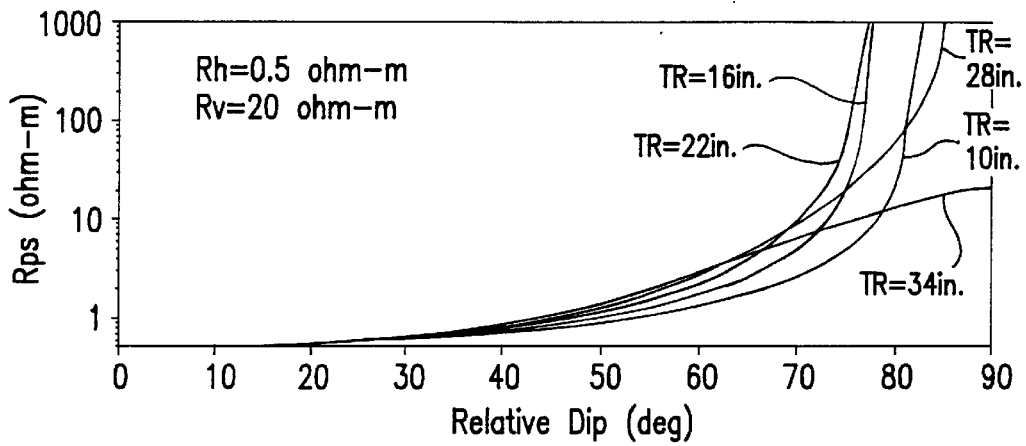
FIG. 4 is a graph of phase-shift, phase-average, and attenuation resistivity responses as a function of relative dip angle for various transmitter-to-receivers spacings, TR, in a transverse isotropic medium with a relatively high anisotropy ratio.
Figure 4B:
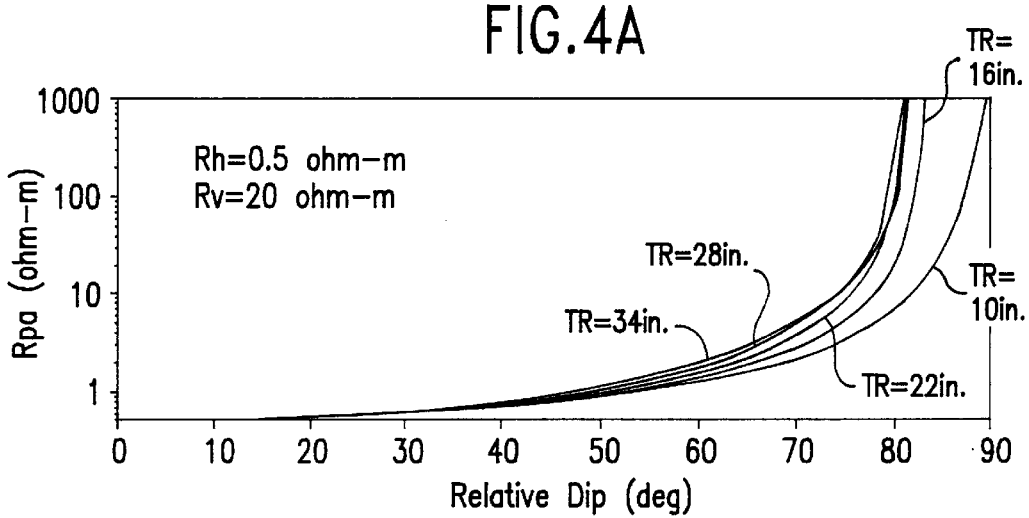
Figure 4C:
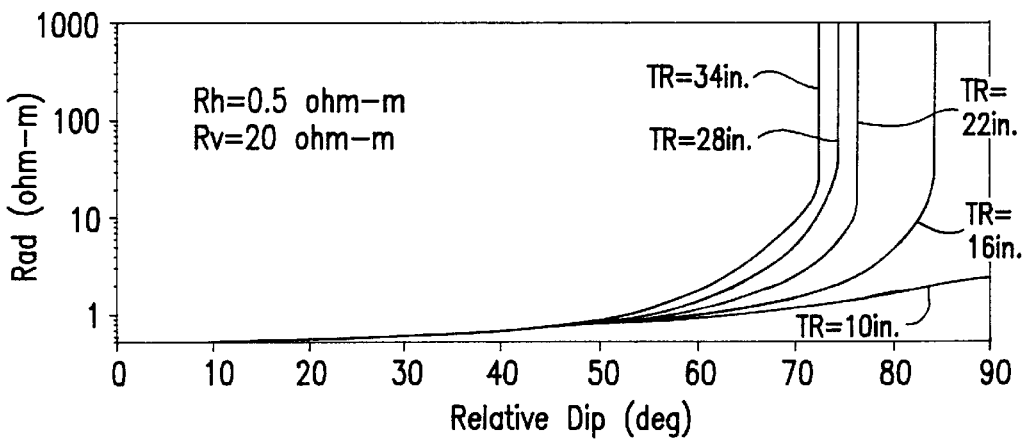
Figure 5A:
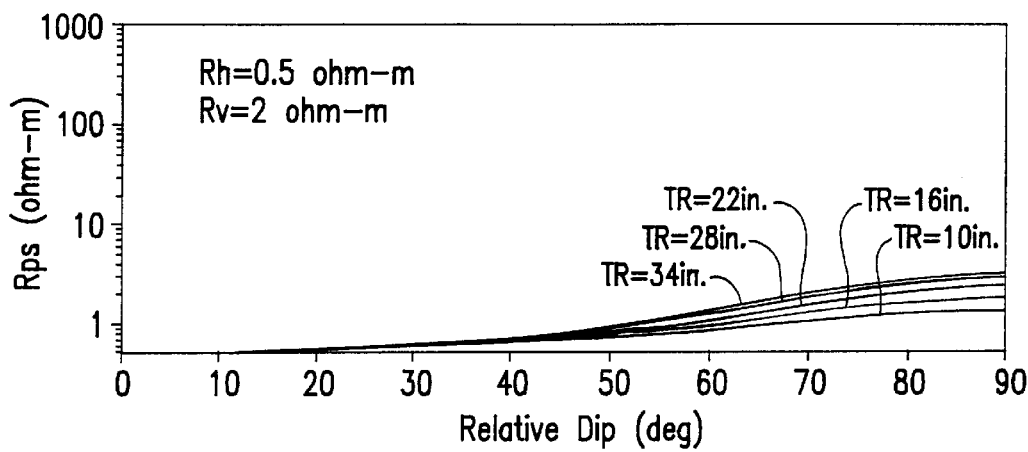
FIG. 5 is a graph of phase-shift, phase-average, and attenuation resistivity responses as a function of relative dip angle for various transmitter-to-receivers spacings, TR, in a transverse isotropic medium with a relatively low anisotropy ratio.
Figure 5B:
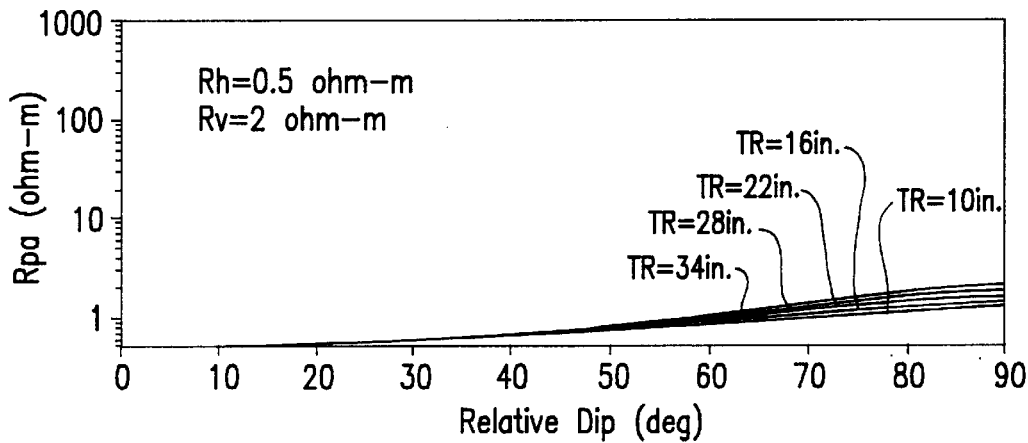
Figure 5C:
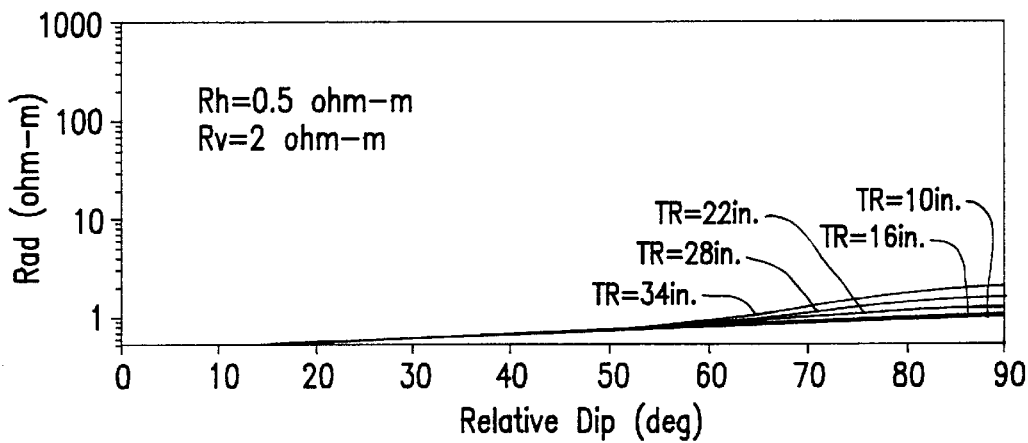

Shown in FIGS. 4 and 5 are examples of phase-shift (Rps), phase-average (Rpa), and attenuation (Rad) resistivity responses as a function of relative dip angle in a transverse isotropic (TI) medium with relatively high (Rh=0.5 ohm-m and Rv=20 ohm-m) and relatively low (Rh=0.5 ohm-m and Rv=2 ohm-m) anisotropy ratio, respectively. These anisotropy response examples can be used to illustrate the following characteristics that can be expected for an anisotropy inversion:

1. Rps, Rpa, Rad hardly respond to Rv at low relative dip angle (Dip<40 degree). At low relative dip angle, the values of these resistivities are very close to Rh regardless of whether the Rv value is 2 or 20 ohm-m. Therefore, it can be expected that the inversion will have a poor resolution of Rv at low dip angle.

2. At higher relative dip angle (dip>40 degree), the anisotropy response increases with dip angle. The Rps, Rpa, and Rad values may exceed Rv at high dip angle. At lower anisotropy ratio, the spreading of the Rps, Rpa, and Rad as a function of transmitter-to-receivers spacing (TR) is orderly, namely, a larger TR measurement will read higher resistivity than a smaller TR measurement. However, at relatively high anisotropy ratio, the spreading of the Rps, Rpa, and Rad as a function of TR is not orderly. This is illustrated for example in FIG. 4 where the Rps 34 inches may be lower then Rps 28 inches, etc. This non-orderly structure precludes use of a simple interpolation type of inversion algorithm. A non-linear least square routine, such as a Levenberg-Marquardt algorithm, together with an extensive initial search routine can be effectively used to handle this difficulty.

3. For cases of high anisotropy ratio at high relative dip angle such as that shown in FIG. 4, most of the Rps and Rad values may go out of the resistivity transform range due to negative phase shift and below geometric spreading attenuation responses. In these cases, it is necessary to include Rpa in the inversion algorithm to enhance the robustness of the algorithm. For example, in the case of FIG. 4 above 85 degrees there are only two valid measurements in Rps and Rad (Rps 34 inches and Rad 10 inches) which are insufficient to invert for three parameters, Rh, Rv, and Dip without using Rpa measurements.

Referring to FIG. 6, there is shown a flow diagram of a routine which, in conjunction with the routines referred to therein, can be used in programming the processors, such as processors 85 and 270 of FIGS. 1 and 2, respectively, to implement operation in accordance with an embodiment of the invention. In the illustrative embodiment hereof, certain operations are performed and/or controlled by downhole or by uphole electronics, as the case may be, but it will be understood that the invention can be implemented with some of the operations performed at different alternative locations. The block 610 represents the routine, described in further detail in conjunction with FIG. 7, for implementing the borehole logging and storage of measurements. This includes measurement of amplitude and phase at each receiver for each of the transmitter-to-receivers spacings. (As described in U.S. Pat. No. 5,594,343, in addition to the five actual transmitter-to-receivers spacings, two more virtual spacings can be computed, so a total of seven spacings are available.) In the present embodiment the measured phase shift $PS_m$, the measured phase average $PA_m$, and the measured attenuation $AD_m$, are computed for each of the transmitter-to-receivers spacings.

The block 620 represents implementing of a setup routine wherein operator selected parameters can be input, if desired. For example, weighting values, treated below, can be selected. Also, if desired, screening can be performed, either manually or automatically, to predetermine (e.g. with a preprocessing routine) conditions under which the technique hereof would not be used or would require modification. An example of such a condition would be when there is no meaningful anisotropy, as may be indicated by substantial correspondence in measurements obtained from all of the various transmitter-to-receivers spacings of the logging apparatus.

The block 630 represents the computation, for each transmitter-to-receivers spacing i, and over the depth range of interest, of the resistivity determined from the measured phase shift, Rps_m(i), resistivity determined from the measured phase average, Rpa_m(i), and resistivity determined from measured attenuation Rad_m(i). The block 635 represents initializing to a first depth level in the depth range of interest. The block 635 is then entered, this block representing a routine, described in conjunction with the flow diagram of FIG. 8, for implementing an initial search to determine candidates for initial model values of Rh, Rv, and Dip. This search is global in nature and is used to provide candidate model values that are close enough to the correct final solution so that the next more refined process of inversion is likely to converge to the correct final solution rather than to another solution made possible by the complex (and not always orderly) nature of the relationships between the measured resistivities at various spacings and the anisotropic formation dip angle. The block 650 is then entered, this block representing a routine, described in conjunction with FIG. 9, for implementing the inversion to determine model values of Rh, Rv and Dip. The determined values are read out and recorded as represented by the block 660. The decision block 670 is then entered, this block representing inquiry as to whether the last depth level to be processed in the present pass has been reached. If not, the depth level index is incremented (block 675), block 640 is re-entered, and the loop 678 continues until all desired depth levels of the depth range have been processed. Readout can be, for example, to another storage or recording medium, or to a display (not shown). (Although all the processing is shown as being performed at the borehole site in the illustrated embodiment, it will be understood that, if appropriate, the processing, or a portion thereof, can be performed remote from the borehole site, such as by a communications link.)

Figure 6A:
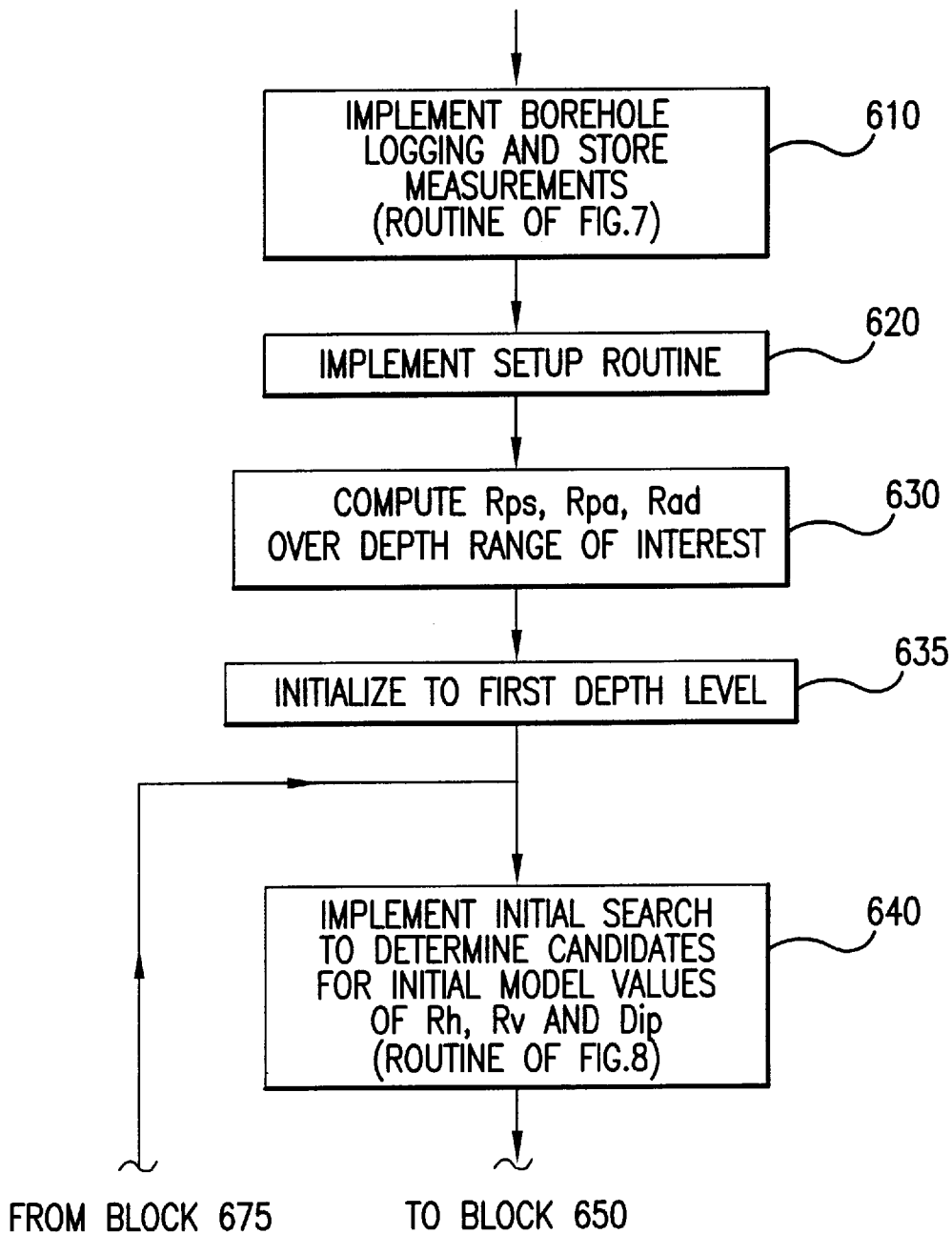
FIG. 6A, is a flow diagram which, in conjunction with the flow diagrams referred to therein, can be used in programming a processor or processors in implementing an embodiment of the invention.
Figure 6B:
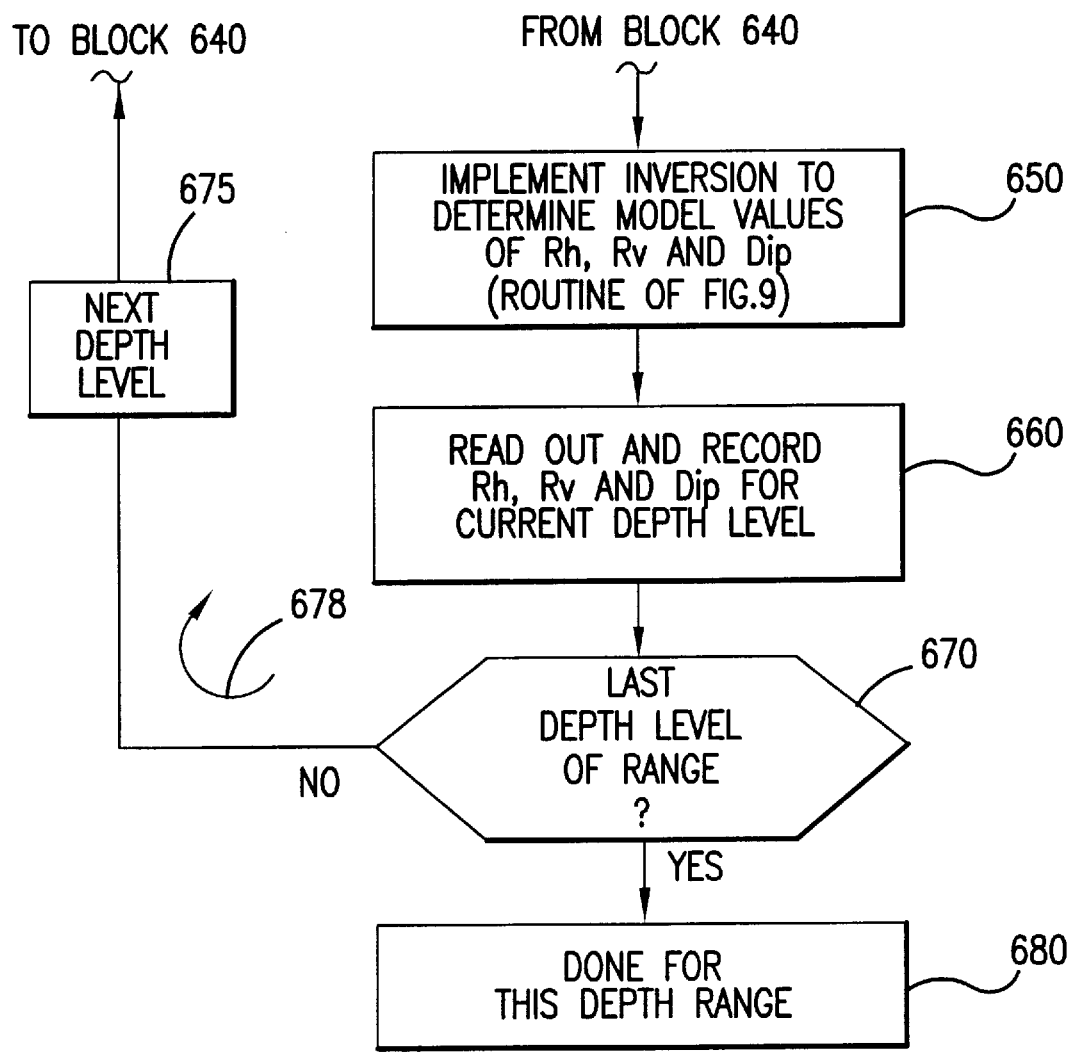
FIG. 6, which includes FIG. 6B placed below
Figure 7A:
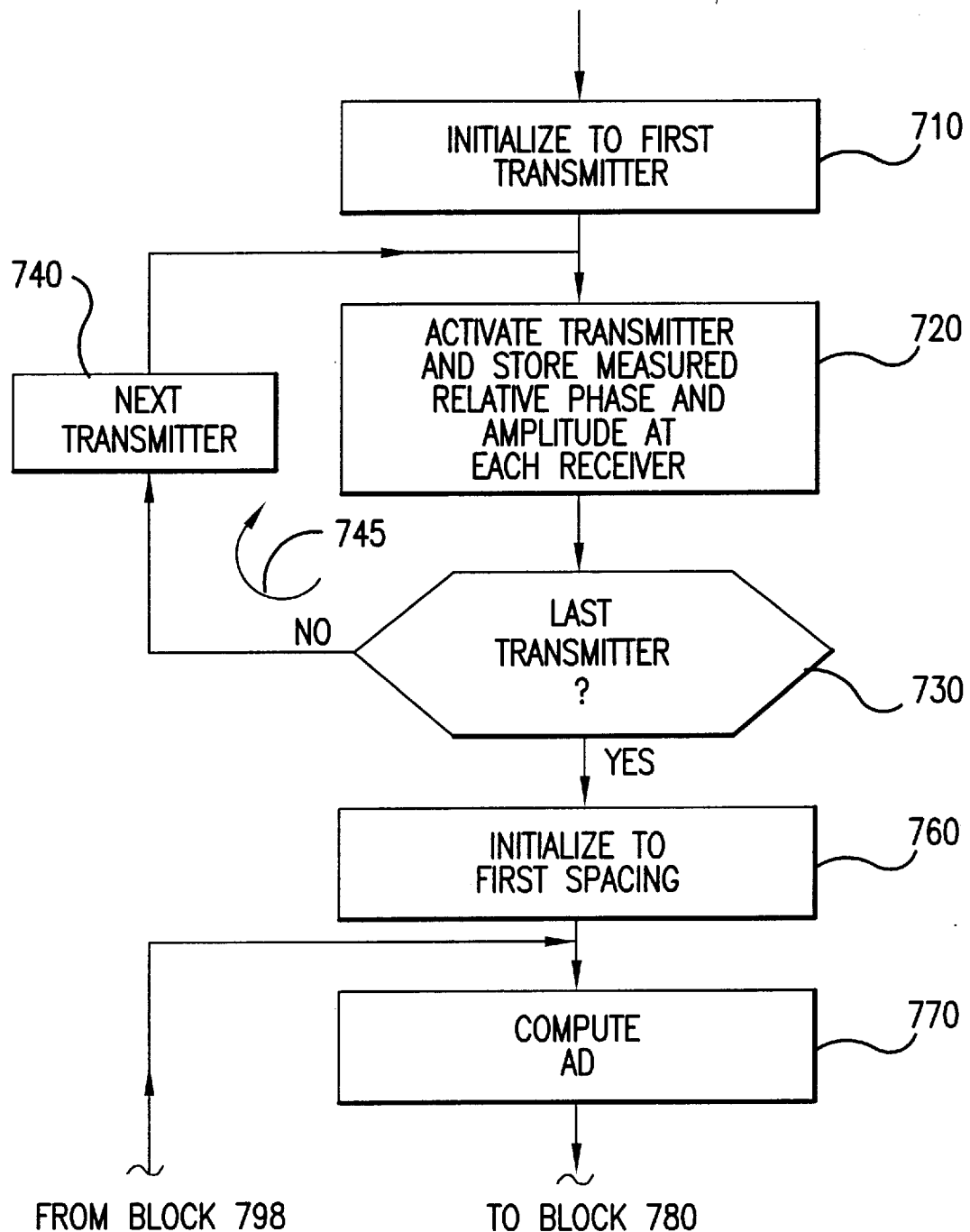
FIG. 7A, is a flow diagram of a routine for controlling a processor to implement borehole logging and storage of measurements.
Figure 7B:
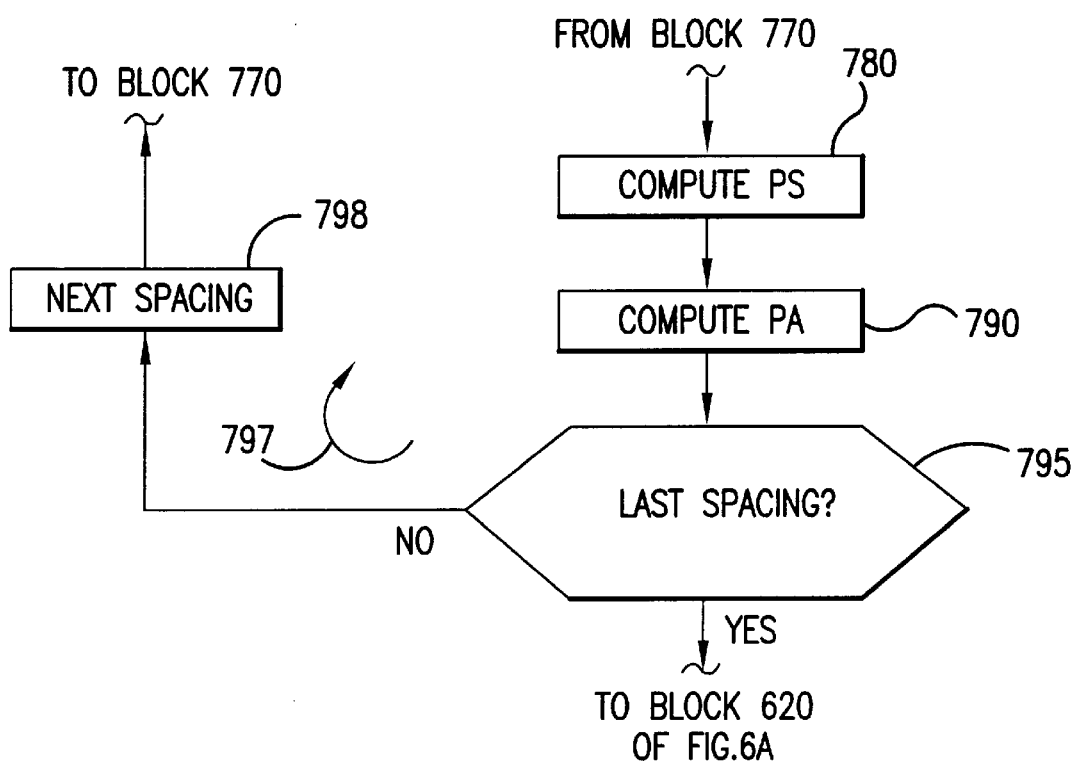
FIG. 7, which includes FIG. 7B placed below

Referring to FIG. 7, there is shown a flow diagram of a routine, represented generally by the block 610 of FIG. 6, for controlling a processor (e.g. 270 of FIG. 2) of the embodiment of FIGS. 1 and 2, to implement borehole logging and store measurements. (The same type of routine can be used for any number of transmitters.) The blocks 710, 720, 730, and 740, and the loop 745, operate to sequentially cause energizing of each transmitter (T1 through T5, in this case), and the controlling of the measuring, at each receiver, of the relative phase and the amplitude of the received signals associated with each energized transmitter. Reference can be made to the above referenced U.S. Pat. No. 5,594,343 for further details. It will be understood also that other techniques can be employed for implementing the measurements. The block 710 represents initializing to the first transmitter, and the block 720 represents activating the transmitter (by control of switch 275 of FIG. 2) and storing the relative phase and the amplitude measured at each of the receivers of the receiver pair R1 and R2 (see FIG. 2). The decision block 730 represents the determination of whether the last transmitter has been activated. If not, the block 740 is entered, the transmitter index is incremented, and the block 720 is re-entered. The loop 745 continues until all measurements have been made and stored for the present depth level.

The blocks 770, 780 and 790 are used to respectively compute, for each transmitter-to-receivers spacing, the attenuation, AD, the phase shift, PS, and the phase average, PA, from the relative phase and amplitude measurements at near receiver R1 (respectively designated $\phi_1$ and $A_1$) and the relative phase and amplitude measurements at far receiver R2 (respectively designated $\phi_2$ and $A_2$). In the present embodiment, the quantities AD, PS, and PA are computed from the following relationships:

AD=20 $\log_{10}[A_1/A_2]$

PS=$\Phi_2-\Phi_1$

PA=$(\Phi_2+\Phi_1)/2$ The block 760 represents initializing to the first transmitter-to-receivers spacing, whereupon AD, PS and PA are computed, as indicated. The decision block 795, increment block 798, and loop 797 are then continued until all spacings have been processed. Alternatively, the blocks 770, 780, and 790 could be under the block 720 in the loop 745, for computation of AD, PS, and PA directly after each set of measurements for a particular spacing is taken.

In an embodiment hereof, the inversion routine utilized is a Levenberg-Marquardt type of algorithm. Starting from initial guess values (determined in a manner to be described), a series of iterations is used in following a path of steepest descent to a local minimum. The inversion technique is described in conjunction with the routine of FIG. 9, but is first summarized as follows:

Rps_m(i), Rpa_m(i), Rad_m(i), are the measured phase-shift, phase-average, and attenuation resistivities at the i-th mixed borehole compensated spacing TR(i), i=1,2, . . . , ntr. In an embodiment hereof, TR(i)=[10, 13, 16, 22, 28, 31, 34] inches, ntr=7.

Define Rps(Rh, Rv, Dip, TR(i)), Rpa(Rh, Rv, Dip, TR(i)), and Rad(Rh, Rv, Dip, TR(i)) as the model computed phase-shift, phase-average, and attenuation resistivities at the i-th mixed borehole compensation spacing TR(i), i=1,2, . . . , ntr.

Since the basic measurements of phase-shift, phase-average, and attenuation are all responding to conductivity, it is advantageous to match the measurements with model values in conductivity space such that the over-all error in matching will not be dominated by a few high resistivity data points. Therefore, define a set of conductivity terms corresponding to the above resistivity terms:

Cps_m(i)=1/Rps_m(i)
Cpa_m(i)=1/Rpa_m(i)
Cad_m(i)=1/Rad_m(i)
Cps(Rh, Rv, Dip, Tr(i))=1/Rps(Rh, Rv, Dip, TR(i))
Cpa(Rh, Rv, Dip, Tr(i))=1/Rpa(Rh, Rv, Dip, TR(i))
Cad(Rh, Rv, Dip, Tr(i))=1/Rad(Rh, Rv, Dip, TR(i)).

The error spanned between the measured data and modeled data is given by:

$$Err(Rh, Rv, Dip) = \sum_{i=1}^{ntr} \{Wps(i) * [Cps(Rh, Rv, Dip, TR(i)) - Cps\_m(i)]^2 + Wpa(i) * [Cpa(Rh, Rv, Dip, TR(i)) - Cpa\_m(i)]^2 + Wad(i) * [Cad(Rh, Rv, Dip, TR(i)) - Cad\_m(i)]^2\} \quad (15)$$

Here, Wps(i), Wpa(i), Wad(i), i=1, . . . , ntr are optional weighting coefficients for phase-shift, phase-average, and attenuation components, respectively. If, for example, the weighting coefficients of any one component are set to zero, the inversion results can then be made independent of that component's data. In addition to assigning a relative importance to the data components, the weighting coefficients can also be used as a switch to shut off any combination of the components. For example, setting Wps(i)=1, Wpa(i)=1, Wad (i)=0, i=1, . . . , ntr, would mean only using the phase-shift and phase-average to do the inversion.

The routine hereof (e.g. a Levenberg-Marquardt algorithm in the present embodiment) will determine the values of inverted model parameters Rh_inv, Rv_inv, and Dip_inv such that Err(Rh_inv, Rv_inv, Dip_inv) achieves a local minimum. The routine requires an initial guess of the model parameters. (As discussed elsewhere herein the general accuracy of the initial guess or guesses is quite important.) Starting from the initial guess values, through a series of iteration steps, the algorithm will follow the path of steepest descent to a local minimum. During the iteration steps, there may be times when the algorithm may determine that the next model parameters to try are negative Rh and/or Rv values. It is therefore necessary to impose a stiff exponentially increased Err value when the guessed Rh and/or Rv values fall below certain values to prevent this condition from occurring. An example of the modified error function, Err_m, is given as:

If Rh>0.05 and Rv>0.05 then $$Err\_m(Rh, Rv, Dip) = \quad (16)$$

$$\sum_{i=1}^{ntr} \{Wps(i) * [Cps(Rh, Rv, Dip, TR(i)) - Cps\_m(i)]^2 + Wpa(i) * [Cpa(Rh, Rv, Dip, TR(i)) - Cpa\_m(i)]^2 + Wad(i) * [Cad(Rh, Rv, Dip, TR(i)) - Cad\_m(i)]^2\}$$

otherwise

Let $R = \min(Rh, Rv)$ if $R > 0.02$ thrn $f\exp = 0.5/R$ otherwise $f\exp = 25.0$ and $$Err\_m(Rh, Rv, Dip) = \sum_{i=1}^{ntr} \{Wps(i) * [\exp(f\exp)]^2 + Wpa(i) * [\exp(f\exp)]^2 + Wad(i) * [\exp(f\exp)]^2\}$$

Figure 8A:
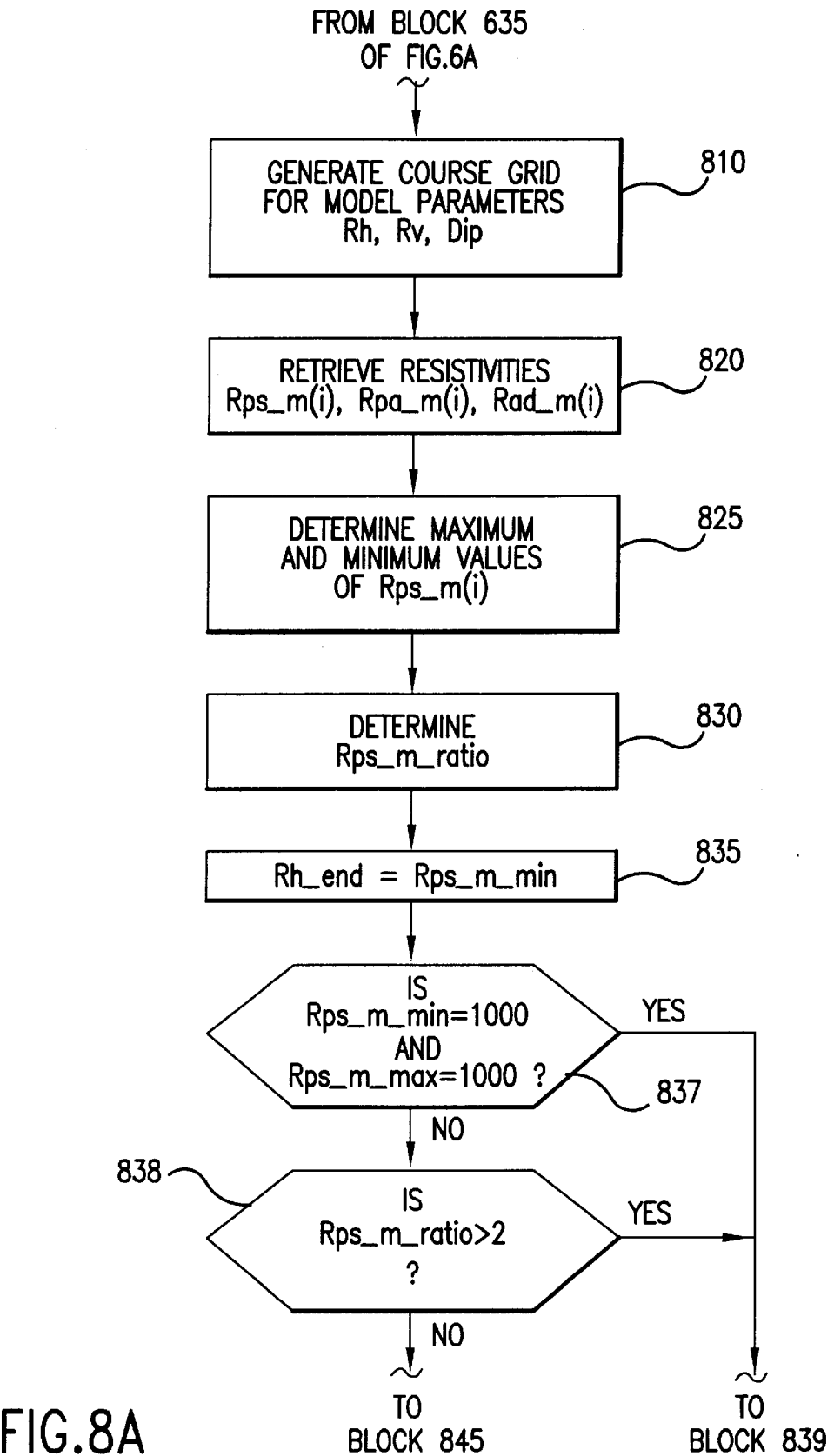
FIG. 8A, is a flow diagram of a routine for implementing an initial search to obtain candidates as initial model values.
Figure 8B:
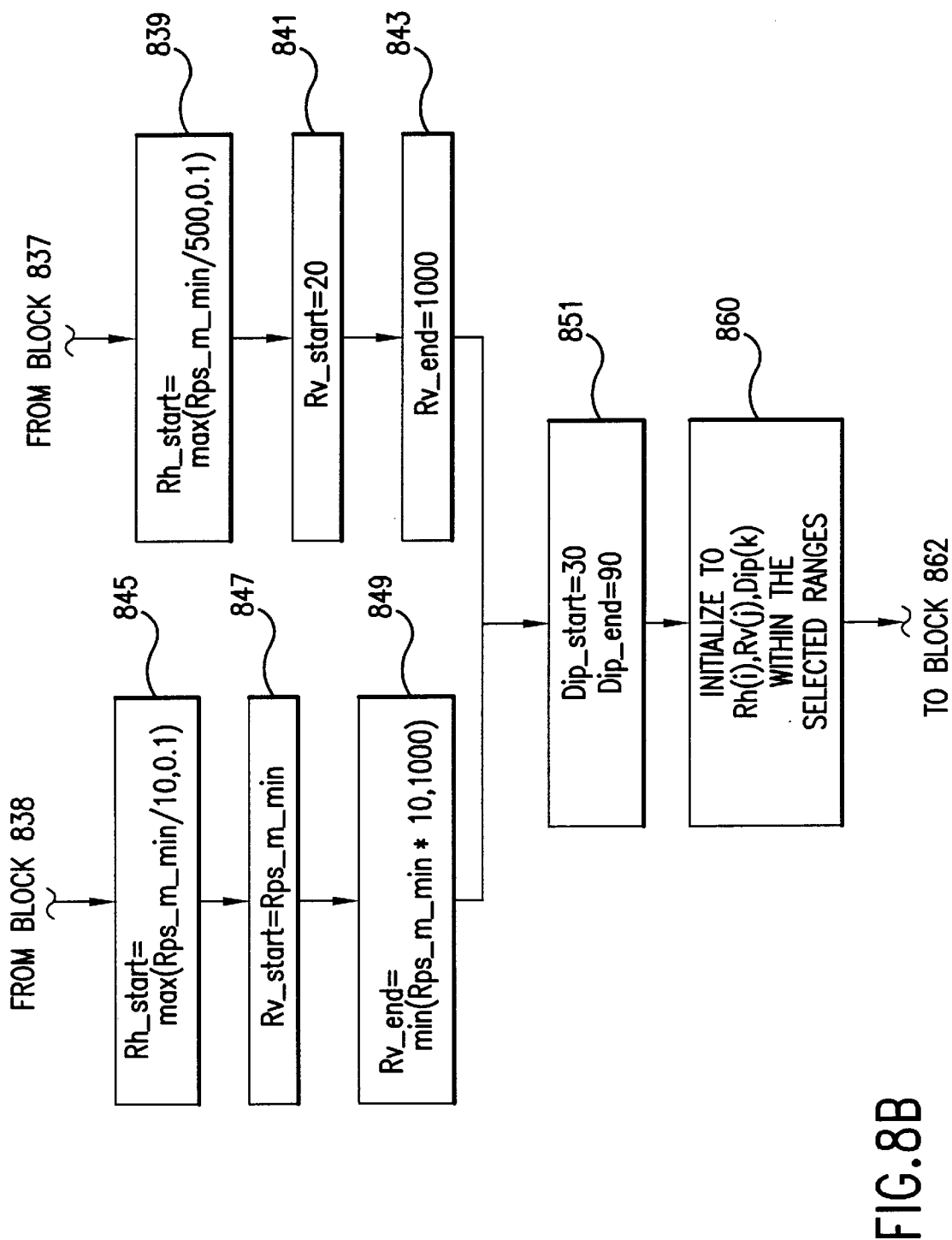
FIG. 8, which includes FIG. 8C placed below FIG. 8B placed below
Figure 8C:
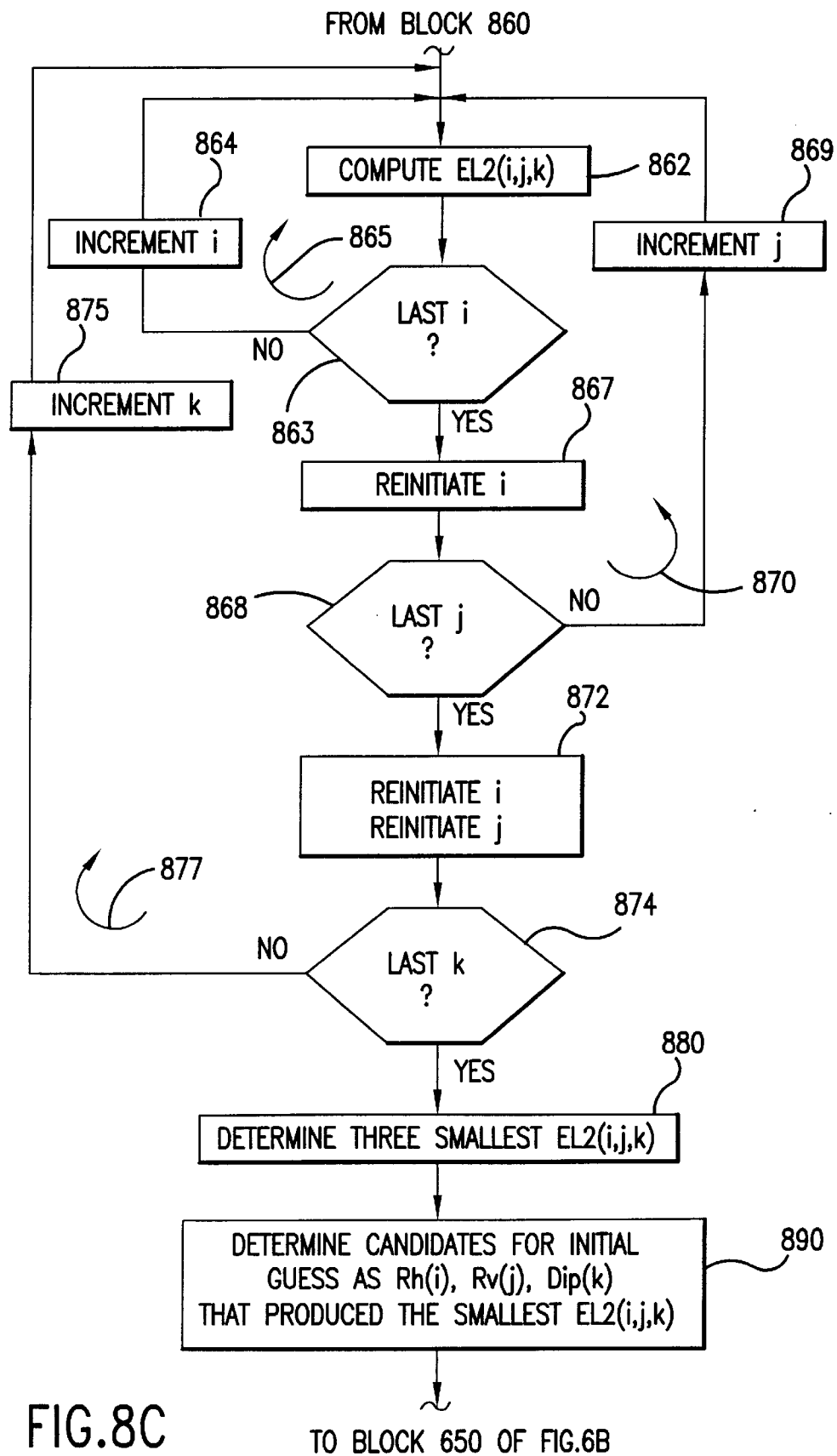

FIG. 8 is a flow diagram of the routine represented by the block 640 of FIG. 6A for implementing the initial search to obtain candidates as initial model values to be used in the subsequent inversion routine. A coarse grid of values is set up for the model parameters Rh, Rv and Dip, as represented by the block 810. In the present embodiment, the grid points for Rh and Rv are denoted by R_grid which is a 22-point vector given as: R_grid=[0.1, 0.15, 0.2, 0.3, 0.5, 0.7, 1.0, 1.5, 2.0, 3.0, 5.0, 7.0, 10.0, 15, 20, 30, 50, 70, 100, 150, 200, 300] ohm-m, and the grid points for the relative dip angle are denoted by Dip_grid which is a 36-point vector given as: Dip_grid=[0, 10, 20, 30, 40, 50, 52, 54, 56, 58, 60, 62, 64, 66, 68, 70, 71, 72, 73, 74, 75, 76, 77, 78, 79, 80, 81, 82, 83, 84, 85, 86, 87, 88, 89, 90] degrees. The previously obtained phase-shift, phase average, and attenuation resistivities, Rps_m(i), Rpa_m(i) and Rad_m(i), i=1, . . . , ntr are retrieved, as represented by the block 820. Optional weighting factors for the resistivities, Wps(i), Wpa(i), and Wad(i), can also be retrieved.

Based on the Rps_m(i) values, the present routine determines the range of Rh and Rv and Dip to be searched over the coarse grid. Then the routine finds three candidates (Rh_ig(m), Rv_ig(m), Dip_ig(m), m=1, 2, 3) over the search range which have the smallest values of Err_m(Rh_ig(m), Rv_ig(m), Dip_ig(m)) as defined in equation (16). The rules, for the present embodiment, for determining the search range for the model parameters are as follows:
Let Rps_m_max, and Rps_m_min be the maximum and minimum values of Rps_m(i), i=1, . . . , ntr, and let Rps_m_ratio=Rps_m_max/Rps_m_min. The boundary points for the search range for the model parameters Rh, Rv, Dip, denoted by Rh_start, Rh_end, Rv_start, Rv_end, Dip_start, Dip_end, are defined by the following:

Rh_end=Rps_m_min
if Rps_m_ratio>2 or Rps_m_min=1000 and Rps_m_max=1000,
then
  Rh_start=max (Rps_m_min/500, 0.1)
otherwise
  Rh_start=max (Rps_m_min/10, 0.1), and;
if Rps_m_min=1000 and Rps_m_max=1000, then
  Rv_start=20
  Rv_end=1000
otherwise
  Rv_start=Rps_m_min
  Rv_end=min (Rps_m_min*10, 1000), and;
Dip_start=30
Dip_end=90.

Referring again to FIG. 8, the block 825 represents determination of the maximum and minimum values of Rps_m(i) and the block 830 represents the determination of Rps_m_ratio of the maximum to the minimum. The end of the range for Rh, designated Rh_end, is set equal to Rps_m_min (block 835). Determination is then made (decision block 837) as to whether Rps_m_min and Rps_m_max are both equal to 1000 ohm-m. (In the present embodiment, 1000 ohm-m is the highest resistivity used, so when Rps_m_min is 1000 ohm-m, Rps_m_max will also be 1000 ohm-m.) If so, Rh_start (the start of the Rh range) is set to the greater of Rps_m_min/500 or 0.1 ohm-m (block 839), Rv_start is set to 20 ohm-m (block 841), and Rv_end is set to 1000 ohm_m (block 843). If not, the Rps_m_ratio is checked (decision block 838) to determine if it is greater than 2. If so, the block 839 is entered and the values or Rh_start, Rv_start, and Rv_end will be determined by the blocks 839, 841 and 843, as above. Otherwise, Rh_start is set to the greater of Rps_m_min/10 or 0.1 ohm-m (block 845), Rv_start is set equal to Rps_m_min (block 847), and Rv_end is set to the lesser of Rps_m_min*10 or 1000 ohm-m (block 849). Also, Dip_start is set to 30 degrees and Dip_end is set to 90 degrees (block 851). Next, Rh(i), Rv(j) and Dip(k) are initialized within the selected ranges (block 860) and EL2(i,j,k) is computed for all i,j,k in the range, in accordance with equation (16), (block 862, in conjunction with nested loops 865 (for i, including blocks 863 and 864), 870 (for j, including blocks 867, 868 and 869) and 877 (for k, including blocks 872, 874 and 875)). The three smallest EL2(i,j,k) are then determined (block 880). Next, the candidates for initial guess are determined as Rh(i), Rv(j), and Dip(k) that produced the three smallest EL(i,j,k) (block 890).

In most of the anisotropy conditions created in the natural deposition process, Rh is smaller than Rv. Therefore, the initial guess algorithm described here is tailored to find such a solution, although theoretical solutions with Rh>Rv frequently exist.

Let Rh(i), Rv(j), Dip(k) be the model parameter grid point values which fall within the boundary points of the model parameters defined above, then Rh_start≦Rh(i)≦Rh-end, i-1,2, . . . , nrh
Rv_start≦Rv(i)≦Rv-end, j-1,2, . . . , nrv
Dip_start≦Dip(k)≦Dip_end, k=1,2, . . . ndip Let EL2(i,j,k) be the Euclidian L2 norm between the measured and the model data at all the grid points within the search range, then we have $$EL2(i, j, k) = \sum_{n=1}^{ntr} \{Wps(n) * [Cps(Rh(i), Rv(j), Dip(k), TR(n)) - $$

$$Cps\_m(n)]^2 + Wpa(n) * [Cpa(Rh(i), Rv(j), Dip(k), TR(n)) - $$

$$Cpa\_m(n)]^2 + Wad(n) * [Cad(Rh(i), Rv(j), Dip(k), TR(n)) - $$

$$Cad\_m(n)]^2\}$$

(17)

$$i = 1, 2, \ldots, nrh, \quad j = 1, 2, \ldots, nrv, \quad k = 1, 2, \ldots, ndip$$

The candidates for initial guess of the model parameters are those that yield the three smallest EL2(i,j,k):

EL2(Rh_ig(1), Rv_ig(1), Dip_ig(1))≦EL2(Rh_ig(2), Rv_ig(2),
Dip_ig(2))≦
EL2(Rh_ig(3), Rv_ig(3), Dip_ig(3))≦EL2(i,j,k).
for all i,j,k such that [Rh(i), Rv(j), Dip(k)] is not equal to [Rh_ig(m), Rv_ig(m), Dip_ig(m)], m=1,2,3.

Figure 9A:
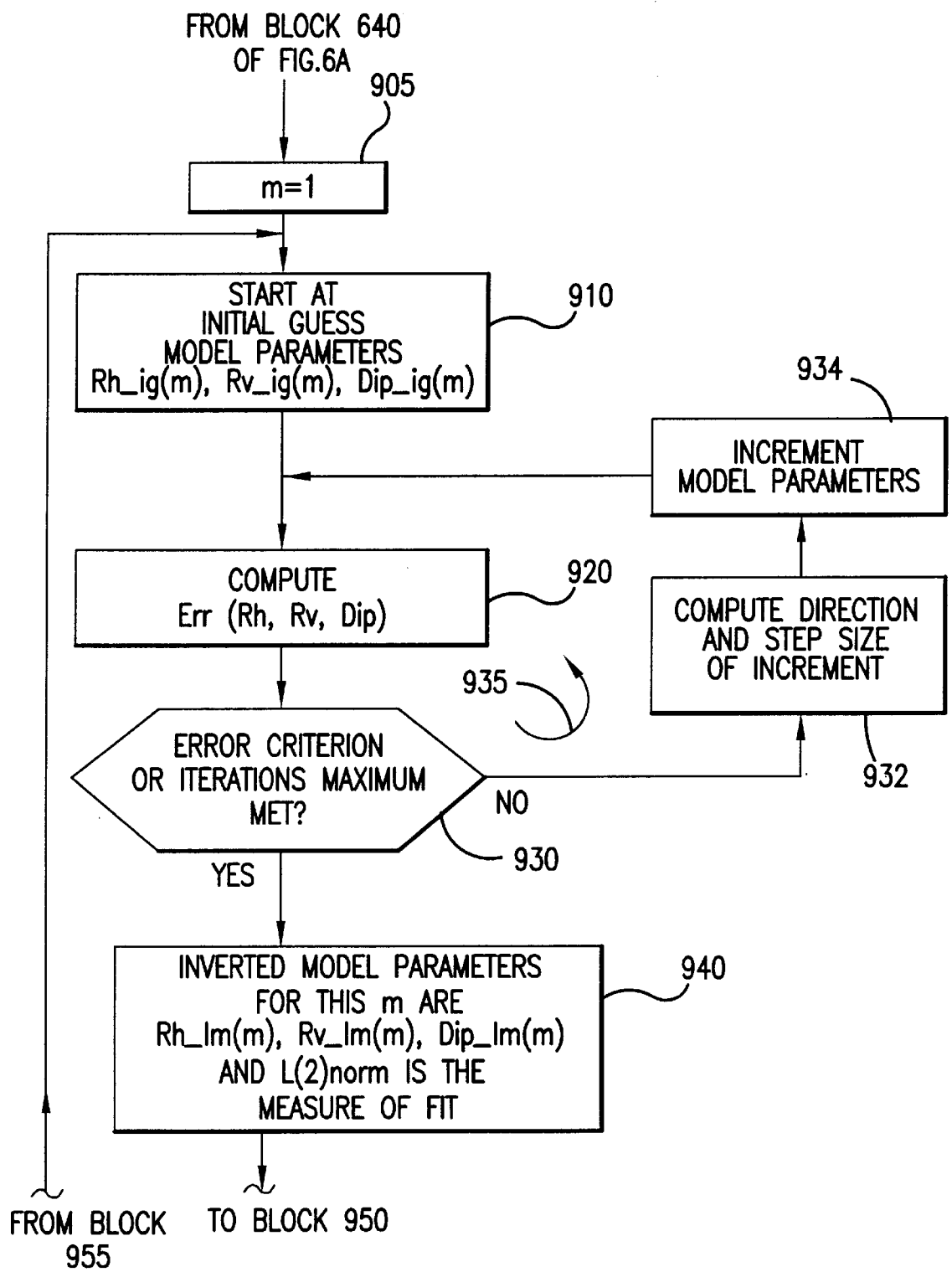
FIG. 9, which includes FIG. 9B placed below FIG. 9A, a flow diagram of a routine for implementing inversion to obtain model parameter values of Rh, Rv, and Dip.
Figure 9B:
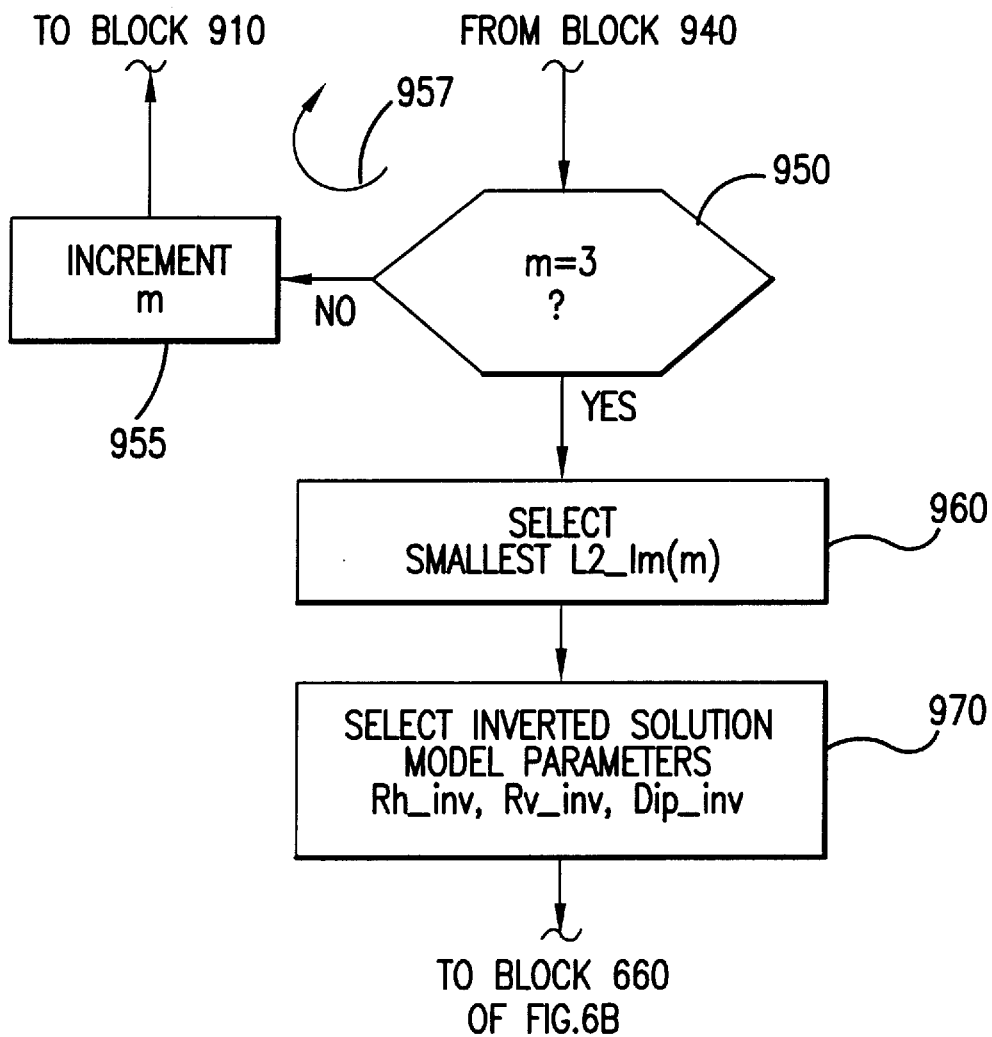

FIG. 9 is a flow diagram of the routine, represented by the block 650 of FIG. 6B, for implementing inversion to determine the inverted model values of Rh, Rv, and Dip. The initial guess index, m, is initialized (block 905) and the initial guess model parameters are started at Rh_ig(m), Rv_ig(m), and Dip_ig(m) (block 910). Next, as represented by the block 920, the error value Err (Rh, Rv, Dip) is computed in accordance with equation (16). As previously noted, the algorithm used for this part of the processing in the present embodiment, is a Levenberg-Marquardt algorithm, which is a well known inversion algorithm. Reference can be made, for example, to *Numerical Analysis—The Levenberg-Marquardt Algorithm. Implementation and Theory*, by Jorge J. More, G. A. Watson, Editor, Springer-Verlag, 1977, and to U.S. Pat. No. 5,329,448 which utilizes a similar general technique of inversion by following a path of steepest descent to a minimum. The decision block 930 represents determination of whether a predetermined error criterion has been met or, if desired, whether a maximum number of iterations have been performed. If not, the block 932 is entered, this block representing the computation of the direction and step size of the increment. The model parameters are then incremented (block 934), the block 920 is re-entered, and the loop 935 continues until the inquiry of block 930 is answered in the affirmative. The inverted model parameters for the current m are determined as Rh_lm(m), Rv_lm(m) and Dip_lm(m), along with the L(2)norm as a measure of the fit (block 940). Inquiry is then made (decision block 950) as to whether the maximum for index m (3, for this embodiment) has been reached. If not, m is incremented (block 955), block 910 is re-entered, and the loop 957 is continued until the inversion has been implemented starting from each of the three initial guess model value parameter sets. When this has been done, the smallest L2_lm(m) is selected (block 960) and the inverted solution model value parameters Rh_inv, Rv_inv, and Dip_inv are selected as the ones with m corresponding with the m of the smallest L2_lm(m) (block 970).

In the above processing there can be implicit assumptions regarding both the horizontal and vertical dielectric constants, which can be expressed as respective functions of horizontal and vertical resistivity, for example $$\epsilon h = 108.5 \cdot Rh^{-0.35} \quad (18)$$

$$\epsilon v = 108.5 \cdot Rv^{-0.35} \quad (19)$$

These assumptions provide additional equations such that one can invert for Rh, Rv, and relative dip angle (Dip) from a minimum of 3 measurements out of the available Rps, Rad, and Rpa measurements at various spacings.

Equations (18) and (19) are derived empirically based on test data from a limited number of rock samples. Although these assumptions are reasonably good, if the actual values of $\epsilon h$ and $\epsilon v$ of a given formation deviate significantly from those predicted by equations (18) and (19), substantial error in Rv and Dip may result.

In an embodiment hereof, inversion can be implemented for Rh and $\epsilon h$ without invoking any dielectric assumption. Rv and $\epsilon v$ can then be calculated if the Dip angle is known. If the Dip angle is unknown, but is within the range of 80° <Dip<100° (a condition commonly met for most horizontal wells) and the degree of anisotropy is not very large, Rv and $\epsilon v$ can also be estimated fairly accurately. Alternatively, Rv, $\epsilon v$, and Dip can be calculated if one makes a dielectric assumption, such as equation (19), on the vertical component. This alternative method allows the flexibility of delaying the making of any assumption until after the inversion.

For a general case, the signals at the receiver coils (induced voltage, phase shift, and attenuation) can be expressed as functions of the five unknown parameters, $\sigma h$, $\epsilon h$, $\sigma v$, $\epsilon v$, and $\theta$ in the following functional form (see e.g. "Processing and Modeling 2-Mhz Resistivity Tools in Dipping, Laminated, Anisotropic Formations" by Martin G. Luling, Richard A. Rosthal, and Frank Shray, SPWLA 35th Annual Logging Symposium, Jun. 19–22, 1994, Paper QQ; and "A New Method to Determine Horizontal-Resistivity in Anisotropic Formations Without Prior Knowledge of Relative Dip" by T. Hagiwara, SPWLA 37th Annual Logging Symposium, Jun. 16–19, 1996, Paper Q]:

$$V = V(\sigma h, \epsilon h, \sigma v, \epsilon v, \theta, TR) = V(Kh, \beta, TR) \quad (20)$$

$$Kh = (i\omega\mu Ch)^{1/2} \quad (21)$$

$$\beta = [\cos^2\theta + (Cv/Ch)\sin^2\theta]^{1/2} \quad (22)$$

$$Ch = \sigma h - i\omega\epsilon h \quad (23)$$

$$Cv = \sigma v - i\omega\epsilon v \quad (24)$$

The symbols used in equations (20)–(24) are defined as the follows:

V—the induced the voltage at the receiver coil
TR—the transmitter-to-receivers distance
Kh—the horizontal wave number
$\beta$—the anisotropy factor
Ch—the complex horizontal conductivity
Cv—the complex vertical conductivity
i—the imaginary operator
$\omega$—the angular frequency (=$2\pi f$, f is frequency)
$\mu$—the magnetic permeability With four or more measurements, one can invert for the two complex numbers, Kh and $\beta$. From the real and imaginary part of Kh, one can solve for Ch and then $\sigma h$ and $\epsilon h$ using equations (21) and (23). From the real and imaginary part of $\beta$ and Ch, there are not a sufficient number of equations to solve for the remaining three unknown parameters, $\sigma v$, $\epsilon v$, and $\theta$. However, without implementing any further inversion, the following options can be used to obtain further results:

(a) Use D & I (direction and inclination) data, such as from a measuring-while-drilling tool and local knowledge of the structural dip of the formation to estimate the relative dip angle $\theta$ and treat it as a known input. Then, using equations (22) and (24), one can solve for $\sigma v$ and $\epsilon v$ from the given values of $\beta$ and $\theta$.

(b) Without solving for $\theta$, one can still estimate fairly accurately the values of $\sigma v$ and $\epsilon v$ if the degree of anisotropy is not excessive and the value of $\theta$ is within the range of $80° \leq \theta \leq 100°$. This range of $\theta$ occurs commonly for the condition of a horizontal well through horizontal beds. From equation (22), one can obtain, $$A + iB = (\beta^2 - 1)Ch = (Cv - Ch)\sin^2\theta \quad (25)$$

$$A = (\sigma v - \sigma h)\sin^2\theta \quad (26)$$

$$B = -\omega(\epsilon v - \epsilon h)\sin^2\theta \quad (27)$$

From the values of $\beta$ and Ch, one can solve for the values of A and B which, in turn allows one to solve for $\sigma v$ and $\epsilon v$, respectively, through equations (26) and (27). In these two equations, the dependence on $\theta$ is through the term $\sin\theta$, which changes very slowly for $\theta$ near 90°, i.e. for $\theta$ in the range of $80° \leq \theta \leq 100°$. Within this range, one can obtain a good approximation of the values of $\sigma v$ and $\epsilon v$ by assigning $\theta = 90°$:

$$\underline{\sigma v} = \sigma h + A \quad (28)$$

$$\underline{\epsilon v} = \epsilon h - B/\omega \quad (29)$$

These approximated values $\underline{\sigma v}$ and $\underline{\epsilon v}$ are always higher than the true values of $\sigma v$ and $\epsilon v$, respectively. It can be shown that the fractional errors of the approximated vertical conductivity and dielectric constant can be written as a function of $\theta$ and their respective ratios of horizontal to vertical values:

$$(\underline{\sigma v} - \sigma v)/\sigma v = (1 - \sigma h/\sigma v)(\sin^2\theta - 1) \quad (30)$$

$$(\underline{\epsilon v} - \epsilon v)/\epsilon v = (1 - \epsilon h/\epsilon v)(\sin^2\theta - 1) \quad (31)$$

Figure 10:
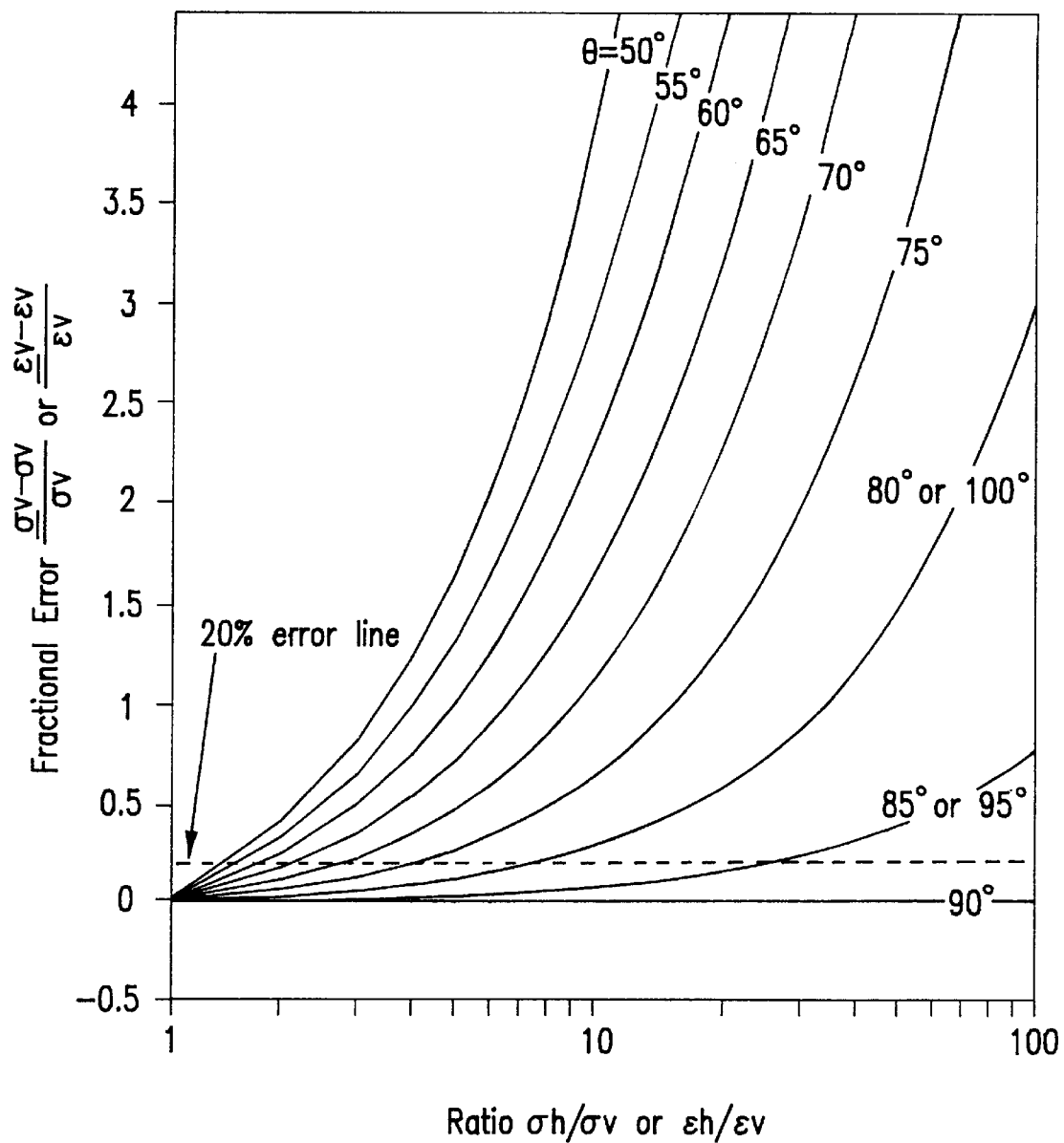
FIG. 10 is a plot of fractional error, for approximated vertical conductivity and dielectric constant, at various dip angles.

The fractional error for the approximated vertical conductivity and dielectric constant are plotted on FIG. 10. It can be seen that the fractional errors for the approximated vertical conductivity and dielectric constant are indeed small for $80° \leq \theta \leq 100°$ and moderate horizontal to vertical ratio (<10).

(c) Assuming a relationship between $\sigma v$ and $\epsilon v$, such as equation (19). Such a dielectric relationship, together with equation (22), provides sufficient equations to solve for the remaining three unknown parameters, σv, εv, and θ. It is more advantageous to invoke a dielectric assumption after the inversion for Kh and β is finished instead of committing to specific assumptions first then inverting for the remaining parameters. After obtaining Kh and β, one can repeatedly try different assumptions, if necessary, to determine the most consistent one without incurring the cost of repeat inversions.

The approach of the inversion of the present embodiment is similar to that of the earlier embodiment, but in this case with a formation model which contains four unknown parameters, Khr, Khi, βr, and βi. Here, Khr and Khi are the real and imaginary parts of the horizontal wave number Kh, and βr and βi are the real and imaginary parts of the anisotropy factor β. In this case PS(Khr, Khi, βr, βi, TR(i)), PA(Khr, Khi, βr, βi, TR(i)) and AD(Khr, Khi, βr, βi, TR(i)) are the model computed phase-shift, phase-average, and attenuation at the i-th mixed borehole compensation spacing TR(i), i=1,2, . . . , ntr. In this more general case, the error spanned between the measured data and modeled data is given by:

$$Err(Khr, Khi, \beta r, \beta i) = \tag{32}$$

$$\sum_{i=1}^{ntr} \{Wps(i) * [PS(Khr, Khi, \beta r, \beta i, TR(i)) - PS\_m(i)]^2 +$$

$$Wpa(i) * [PA(Khr, Khi, \beta r, \beta i, TR(i)) - PA\_m(i)]^2 +$$

$$Wad(i) * [AD(Khr, Khi, \beta r, \beta i, TR(i)) - AD\_m(i)]^2\}$$

For the above exemplary logging tool there are a total of twenty one measurements (PS_m(i), PA_m(i) and AD_m (i)) available for the inversion process. Since there are only four unknown parameters in the model, a minimum of four measurements are needed for the inversion. If all the measurements are of the same high quality (low noise and fit the TI model), due to the benefit of additional averaging, the more measurements used in the inversion the better the results. However, if some measurements are corrupted more than others due to noise or deviation from the TI model, then inclusion of the more corrupted data in the inversion may lead to a lower quality result. Therefore, one should preferably choose only the highest quality measurements (at least four of them) to be included in the inversion process.

In this case, the initial search algorithm searches for the initial guess values for model parameters Khr, Khi, βr, βi through searching over a coarse grid values of Rh, Rv, εh, εv and θ. The grid point values for εh and εv are determined by the grid point values of Rh and Rv, respectively, through equations (18) and (19). A 10-point grid is set up for the relative dip angle θ. The values of the Rh, Rv, and θ grid for this case can be:
Rh(i)=$10^{(-1.0+i \cdot 0.04)}$ ohm-m, i=1,2. , , , 100
Rv(j)=$10^{(-1.0+i \cdot 0.04)}$ ohm-m, j=1,2. , , , 100
Dip(k)=[0, 50, 55, 60, 65, 70, 75, 80, 85, 90] degrees, for k=1,2, . . . , 10

Also for this case the model parameters Khr, Khi, βr, βi at the grid points can be written as:
Khr_g(i)=Khr(Rh_g(i))
Khi_g(i)=Khi(εh(Rh_g(i)))
βr_g(i,j,k)=βr(Rh_g(i), Rv_g(j), εh(Rh_g(i)), εv(Rv_g(j), Dip_g(k))
βi_g(i,j,k)=βi(Rh_g(i), Rv_g(j), εh(Rh_g(i)), εv(Rv_g(j), Dip_g(k))
i=1,2, . . . nrh, j=1,2, . . . , nrv, k=1,2, . . . . , ndip
and the Euclidian L2 norm between the measured and the model data at all the grid points within the search range is:

$$EL2(i, j, k) = \sum_{n=1}^{ntr} \{Wps(n) *$$

$$[PS(Khr\_g(i), Khi\_g(i), \beta r\_g(i, j, k), \beta i\_g(i, j, k), TR(n)) -$$

$$PS\_m(n)]^2 + Wpa(n) * [PA(Khr\_g(i), Khi\_g(i), \beta r\_g(i, j, k),$$

$$\beta i\_g(i, j, k), TR(n)) - PA\_m(n)]^2 + Wad(n) * [AD(Khr\_g(i),$$

$$Khi\_g(i), \beta r\_g(i, j, k), \beta i\_g(i, j, k), TR(n)) - AD\_m(n)]^2\}$$

$$i = 1, 2, \ldots, nrh, \quad j = 1, 2, \ldots, nrv, \quad k = 1, 2, \ldots, ndip$$

Again, the candidates for initial guess of the model parameters are those that yield the three smallest EL2(i,j,k). The candidates for the initial guess of the four model parameters are given as:
Khr_g(i1), Khi_g(i1), βr_g(i1,j1,k1), βi_g(i1,j1,k1)
Khr_g(i2), Khi_g(i2), βr_g(i2,j2,k2), βi_g(i2,j2,k2)
Khr_g(i3), Khi_g(i3), βr_g(i3,j3,k3), βi_g(i3,j3,k3)
The final inverted solution is chosen as the one that has the smallest L2_lm value:
Khr_inv=Khr_lm(m),
Khi_inv=Khi_lm(m),
βr_inv=βr_lm(m),
βi_inv=βi_lm(m),
L2_inv=L2_lm(m),
where m is the index such that L2_lm(m)=min(L2_lm(n), n=1,2,3). L2_inv can be used as a quality indicator for the inversion.

After obtaining the values of Khr, Khi, βr, and βi, Rh and εh can be obtained directly from Khr and Khi using equation (21) and (23). Rv, εv, and, for some cases, θ, can be obtained according to the three options outlined above.

(a) Assuming θ is known:
Rv and εv can be computed using equations (21) and (23).

(b) When θ is unknown but is within the range $80° \leq \theta \leq 100°$ and moderate horizontal to vertical ratio (<10): Rv and εv can be approximated using equations (23), (25), (26), (27), (28), and (29).

(c) When a dielectric assumption on the vertical component, such as equation (19) can be made: Rv, εv, and θ can be computed using equations (19) and (22).

I claim:

1. A method for determining the horizontal resistivity, vertical resistivity, and dip of formations surrounding a borehole, comprising the steps of:

(a) suspending a logging device in the borehole;

(b) transmitting electromagnetic energy from a transmitter location on the logging device, and receiving the transmitted electromagnetic energy at receiver locations on the logging device for a first transmitter-to-receivers spacing associated with said transmitter and receiver locations;

(c) determining, from the received electromagnetic energy, measurement characteristics associated with said first transmitter-to-receivers spacing;

(d) repeating steps (b) and (c) for a plurality of further transmitter-to-receivers spacings to obtain measurement characteristics for said plurality of further transmitter-to-receivers spacings;

(e) generating a model of anisotropic formations that has horizontal resistivity Rh, vertical resistivity Rv, and a Dip angle with respect to a borehole reference;

(f) selecting initial model values of Rh, Rv and Dip;

(g) computing an error value from the differences, for each of a plurality of said transmitter-to-receivers spacings, between said measurement characteristics and model measurement characteristics obtained from said model using the model values of Rh, Rv, and Dip;

(h) modifying said model values of Rh, Rv and Dip;

(i) repeating steps (g) and (h) to minimize said error value; and (j) outputting the ultimately modified model values of Rh, Rv, and Dip.

2. The method as defined by claim 1, wherein said measurement characteristics comprise phase-shift, phase-average, and attenuation.

3. The method as defined by claim 2, further comprising repeating said method at a multiplicity of depth level positions of said logging device in said borehole to obtain a log of at least one of Rh, Rv and Dip.

4. The method as defined by claim 2, further comprising repeating said method at a multiplicity of depth level positions of said logging device in said borehole to obtain logs of Rh, Rv and Dip.

5. The method as defined by claim 2, wherein the step of selecting initial model values of Rh, Rv, and Dip comprises:

producing discretized model values of Rh, Rv and Dip;

comparing said measurement characteristics with model measurement characteristics obtained using a multiplicity of combinations of discretized model values; and selecting, as said initial model values, discretized model values based on the comparisons of said comparing step.

6. The method as defined by claim 1, wherein said measurement characteristics comprise resistivity derived from phase-shift, resistivity derived from phase-average, and resistivity derived from attenuation.

7. The method as defined by claim 1, wherein said model of anisotropic formations is a transverse isotropic model.

8. The method as defined by claim 1, wherein said step of suspending a logging device in the borehole comprises coupling a logging-while-drilling device in a drill string in the borehole.

9. The method as defined by claim 1, wherein the step of selecting initial model values of Rh, Rv, and Dip comprises:

producing discretized model values of Rh, Rv and Dip;

comparing said measurement characteristics with model measurement characteristics obtained using a multiplicity of combinations of discretized model values; and selecting, as said initial model values, discretized model values based on the comparisons of said comparing step.

10. A method for determining properties of anisotropic formations surrounding a borehole, comprising the steps of:

(a) suspending a logging device in the borehole;

(b) transmitting electromagnetic energy from a transmitter location on the logging device, and receiving the transmitted electromagnetic energy at receiver locations on the logging device for a first transmitter-to-receivers spacing associated with said transmitter and receiver locations;

(c) determining, from the received electromagnetic energy, measurement characteristics associated with said first transmitter-to-receivers spacing;

(d) repeating steps (b) and (c) for a plurality of further transmitter-to-receivers spacings to obtain measurement characteristics for said plurality of further transmitter-to-receivers spacings;

(e) generating a model of anisotropic formations that has model anisotropy properties;

(f) selecting initial model values of said anisotropy properties;

(g) computing an error value from the differences, for each of a plurality of said transmitter-to-receivers spacings, between said measurement characteristics and model measurement characteristics obtained from said model using the model values of said anisotropy properties;

(h) modifying said model values of said anisotropy properties;

(i) repeating steps (g) and (h) to minimize said error value; and (j) outputting the ultimately modified model values of said anisotropy properties;

said step of selecting initial model values of said anisotropy properties including the steps of:

(k) producing discretized model values of said anisotropy properties;

(l) comparing said measurement characteristics with model measurement characteristics obtained using a multiplicity of combinations of discretized model values; and (m) selecting, as said initial model values, discretized model values based on the comparisons of said comparing step.

11. The method as defined by claim 10, wherein said measurement characteristics comprise phase-shift, phase-average, and attenuation.

12. The method as defined by claim 11, wherein said anisotropy properties are Khr, Khi, $\beta$r and $\beta$i, where Khr and Khi are the real and imaginary parts of the horizontal wave number Kh, and $\beta$r and $\beta$i are the real and imaginary parts of the anisotropy factor $\beta$, and where Kh is a function of horizontal conductivity and horizontal dielectric constant and $\beta$ is a function of vertical conductivity and vertical dielectric constant.

13. The method as defined by claim 10, wherein said measurement characteristics comprise resistivity derived from phase-shift, resistivity derived from phase-average, and resistivity derived from attenuation.

14. The method as defined by claim 10, wherein said model of anisotropic formations is a transverse isotropic model.

15. The method as defined by claim 14, wherein said anisotropy properties are Khr, Khi, $\beta$r and $\beta$i, where Khr and Khi are the real and imaginary parts of the horizontal wave number Kh, and $\beta$r and $\beta$i are the real and imaginary parts of the anisotropy factor $\beta$, and where Kh is a function of horizontal conductivity and horizontal dielectric constant and $\beta$ is a function of vertical conductivity and vertical dielectric constant.

16. The method as defined by claim 10, further comprising repeating said method at a multiplicity of depth level positions of said logging device in said borehole to obtain a log of at least one of horizontal resistivity Rh, vertical resistivity Rv and Dip angle with respect to a borehole reference.

17. The method as defined by claim 10, wherein said step of suspending a logging device in the borehole comprises coupling a logging-while-drilling device in a drill string in the borehole.

18. The method as defined by claim 10, wherein said anisotropy properties are Khr, Khi, $\beta$r and $\beta$i, where Khr and Khi are the real and imaginary parts of the horizontal wave number Kh, and $\beta r$ and $\beta i$ are the real and imaginary parts of the anisotropy factor $\beta$, and where Kh is a function of horizontal conductivity and horizontal dielectric constant and $\beta$ is a function of vertical conductivity and vertical dielectric constant.

19. Apparatus for determining the horizontal resistivity, vertical resistivity, and dip of formations surrounding a borehole, comprising:

(a) a logging device suspendible in the borehole;

(b) means for transmitting electromagnetic energy from a transmitter location on the logging device, and receiving the transmitted electromagnetic energy at receiver locations on the logging device for a first transmitter-to-receivers spacing associated with said transmitter and receiver locations;

(c) means for determining, from the received electromagnetic energy, measurement characteristics associated with said first transmitter-to-receivers spacing;

(d) means for repeating operation of elements (b) and (c) for a plurality of further transmitter-to-receivers spacings to obtain measurement characteristics for said plurality of further transmitter-to-receivers spacings;

(e) means for generating a model of anisotropic formations that has horizontal resistivity Rh, vertical resistivity Rv, and a Dip angle with respect to a borehole reference;

(f) means for selecting initial model values of Rh, Rv and Dip;

(g) means for computing an error value from the differences, for each of a plurality of said transmitter-to-receivers spacings, between said measurement characteristics and model measurement characteristics obtained from said model using the model values of Rh, Rv, and Dip;

(h) means for modifying said model values of Rh, Rv and Dip;

(i) means for repeating steps (g) and (h) to minimize said error value; and (j) means for outputting the ultimately modified model values of Rh, Rv, and Dip.

20. Apparatus as defined by claim 19, wherein said measurement characteristics comprise phase-shift, phase-average, and attenuation.

21. Apparatus as defined by claim 19, wherein said measurement characteristics comprise resistivity derived from phase-shift, resistivity derived from phase-average, and resistivity derived from attenuation.

22. Apparatus as defined by claim 19, wherein said model of anisotropic formations is a transverse isotropic model.

23. Apparatus as defined by claim 19, wherein said logging device is a logging-while-drilling device in a drill string in the borehole.

* * * * *